(12) United States Patent
Kim et al.

(10) Patent No.: US 12,273,758 B2
(45) Date of Patent: Apr. 8, 2025

(54) METHOD AND DEVICE FOR RECORDING INFORMATION IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 17/792,320

(22) PCT Filed: Apr. 7, 2021

(86) PCT No.: PCT/KR2021/004340
§ 371 (c)(1),
(2) Date: Jul. 12, 2022

(87) PCT Pub. No.: WO2021/206442
PCT Pub. Date: Oct. 14, 2021

(65) Prior Publication Data
US 2023/0117513 A1    Apr. 20, 2023

(30) Foreign Application Priority Data

Apr. 9, 2020    (KR) .................. 10-2020-0043658

(51) Int. Cl.
*H04W 24/10*    (2009.01)
*H04W 48/16*    (2009.01)
(Continued)

(52) U.S. Cl.
CPC .......... *H04W 24/10* (2013.01); *H04W 48/16* (2013.01); *H04W 76/27* (2018.02); *H04W 84/042* (2013.01)

(58) Field of Classification Search
None
See application file for complete search history.

(56) References Cited

U.S. PATENT DOCUMENTS 10,257,734 B2    4/2019    Kim et al.
2012/0040621 A1    2/2012    Jung et al.
(Continued)

FOREIGN PATENT DOCUMENTS

CN    102884830 A    1/2013
CN    103026750 A    4/2013
(Continued)

OTHER PUBLICATIONS

Huawei et al, Report of email discussion [108#42] running 38.331 CR to support SON and MDT, R2-2001363, 3GPP TSG-RAN WG2 Meeting #109-e, Feb. 17, 2020, Electronic meeting.
(Continued)

*Primary Examiner* — Kenneth B Wells
(74) *Attorney, Agent, or Firm* — Jefferson IP Law, LLP

(57) ABSTRACT

The present disclosure relates to an operation method of a user equipment (UE) and a device therefor, and the operation method includes: receiving, from a base station, a radio resource control (RRC) message including Logged minimization of drive test (MDT) configuration information for performing logging of a measurement result while the UE is in an RRC IDLE mode or an RRC INACTIVE mode, identifying a report type configured for the UE, based on the Logged MDT configuration information, determining whether conditions for performing Logged MDT are satisfied, based on the report type and the Logged MDT configuration information including at least one of a public land mobile network (PLMN) identity list or area configuration information, when the conditions are satisfied, performing a (Continued)

measurement based on a configured logging interval, and performing logging of a result of the measurement.

15 Claims, 13 Drawing Sheets

(51) Int. Cl.
*H04W 76/27* (2018.01)
*H04W 84/04* (2009.01)

(56) References Cited

U.S. PATENT DOCUMENTS

| | | |
|---|---|---|
| 2013/0178216 A1 | 7/2013 | Chang et al. |
| 2014/0056168 A1 | 2/2014 | Jung et al. |
| 2014/0113656 A1* | 4/2014 | Schmidt ............... H04W 24/10 455/456.2 |
| 2014/0301239 A1* | 10/2014 | Fukuta ................ H04W 24/10 370/252 |
| 2015/0056925 A1* | 2/2015 | Jung ................... H04W 24/10 455/67.11 |
| 2018/0160416 A1* | 6/2018 | Mitsui ................. H04W 88/06 |
| 2018/0199251 A1 | 7/2018 | Kim et al. |
| 2018/0270688 A1 | 9/2018 | Jung et al. |
| 2020/0413279 A1 | 12/2020 | Kim et al. |
| 2021/0345144 A1* | 11/2021 | Yang .................... H04W 24/10 |
| 2021/0360449 A1 | 11/2021 | Kim et al. |

FOREIGN PATENT DOCUMENTS

| | | |
|---|---|---|
| CN | 106416352 A | 2/2017 |
| WO | 2012-148202 A2 | 11/2012 |
| WO | 2019/214731 A1 | 11/2019 |
| WO | 2019/221436 A1 | 11/2019 |
| WO | 2020-050575 A1 | 3/2020 |

OTHER PUBLICATIONS

Huawei et al, CR for introducing MDT and SON, R2-2001364, 3GPP TSG-RAN WG2 Meeting #109-e, Feb. 17, 2020, Electronic meeting.
CMCC et al, CR to Introduce NR MDT, R2-2002002, 3GPP TSG-RAN WG2 Meeting #109-e, Mar. 11, 2020, Elbonia.
International Search Report dated Jul. 1, 2021, issued in International Application No. PCT/KR2021/004340.
Extended European Search Report dated May 8, 2023, issued in a European Patent Application No. 21785675.6.
Ericsson; On the relation between UE memory, logged MDT measurements, and the UE location information; 3GPP TSG-RAN WG2#106; Tdoc R2-1906875, May 13, 2019, Reno, US.
3GPP TS 37.320 V16.0.0; 3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16), Apr. 7, 2020.
Chinese Office Action dated May 15, 2024, issued in a Chinese Patent Application No. 202180023057.1.
ZTE, Measurement configuration for Logged MDT, R2-141089, 3GPP TSG-RAN WG2#85bis, Mar. 21, 2014, Valencia, Spain.
Chinese Office Action dated Oct. 18, 2024, issued in Chinese Application No. 202180023057.1.
Chinese Notice Of Allowance dated Dec. 27, 2024, issued in Chinese Application No. 202180023057.1.
European Office Action dated Feb. 24, 2025, issued in a European Application No. 21785675.6.

* cited by examiner

METHOD AND DEVICE FOR RECORDING INFORMATION IN MOBILE COMMUNICATION SYSTEM

TECHNICAL FIELD

The present disclosure relates to a method and device for performing logging of information in a mobile communication system.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60 gigahertz (GHz) band) is under consideration to achieve high data transfer rates. To mitigate path loss of radio waves and increase transmission distance of radio waves in an ultra-high frequency band for 5G communication systems, technologies such as beamforming, massive multiple-input multiple-output (massive MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

As various services may be provided due to the development of mobile communication systems and the aforementioned techniques, in particular, a method for performing logging of information in a mobile communication system is required.

DESCRIPTION OF EMBODIMENTS

Technical Problem

Embodiments of the present disclosure provide a method and device for performing logging of information in a mobile communication system.

Solution to Problem

According to an embodiment of the present disclosure, an operation method of a user equipment (UE) in a wireless communication system may include: receiving, from a base station, a radio resource control (RRC) message including Logged minimization of drive test (MDT) configuration information for performing logging of a measurement result while the UE is in an RRC IDLE mode or an RRC INACTIVE mode, identifying a report type configured for the UE, based on the Logged MDT configuration information, determining whether conditions for performing Logged MDT are satisfied, based on the report type and the Logged MDT configuration information including at least one of a public land mobile network (PLMN) identity list or area configuration information, when the conditions are satisfied, performing a measurement based on a configured logging interval, and performing logging of a result of the measurement.

Advantageous Effects of Disclosure

According to embodiments of the present disclosure, a method and device for efficiently performing logging of information in a mobile communication system may be provided.

BEST MODE

Figure 1A:
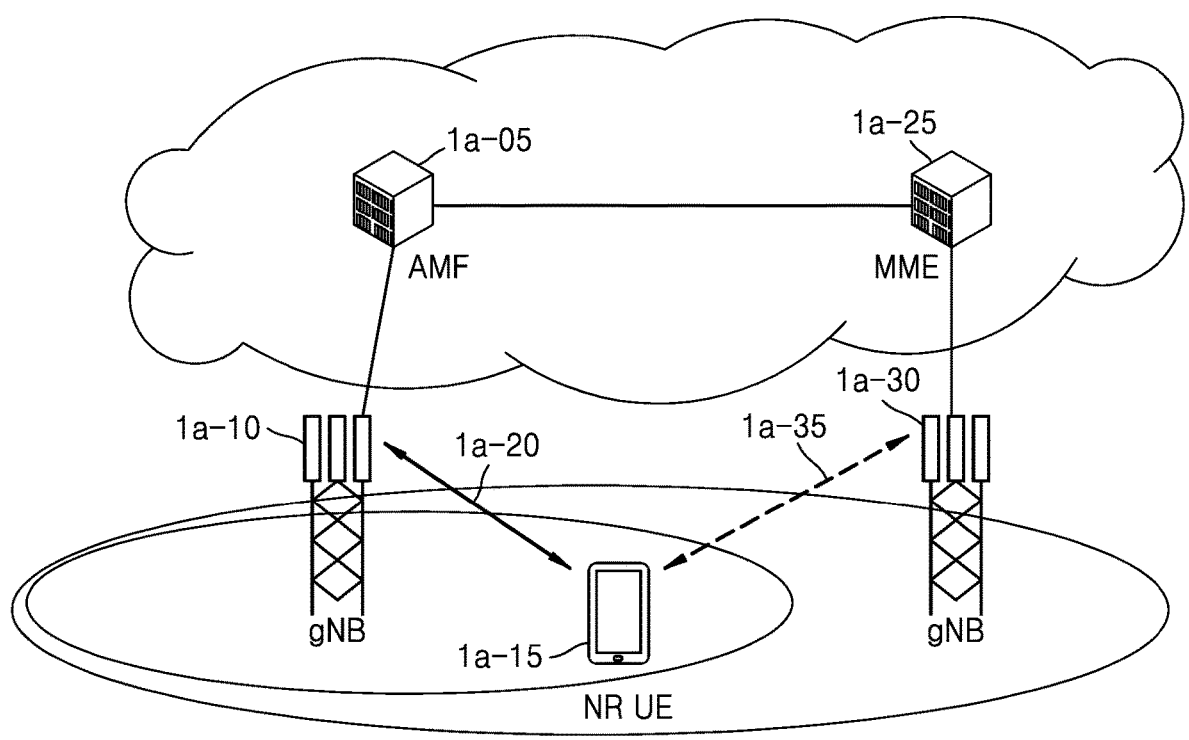
FIG. 1A illustrates a structure of a next-generation mobile communication system.

According to an embodiment of the present disclosure, an operation method of a user equipment (UE) in a wireless communication system may include: receiving, from a base station, a radio resource control (RRC) message including Logged minimization of drive test (MDT) configuration information for performing logging of a measurement result while the UE is in an RRC IDLE mode or an RRC INACTIVE mode, identifying a report type configured for the UE, based on the Logged MDT configuration information, determining whether conditions for performing Logged MDT are satisfied, based on the report type and the Logged MDT configuration information including at least one of a public land mobile network (PLMN) identity list or area configuration information, when the conditions are satisfied, performing a measurement based on a configured logging interval, and performing logging of a result of the measurement.

According to an embodiment of the present disclosure, the determining of whether the conditions for performing the Logged MDT are satisfied may include: in a case that the report type is identified as being event triggered, identifying an event type configured for the UE, based on the Logged MDT configuration information, and in a case that the event type is identified as event L1, determining that the conditions are satisfied when the UE camps on a cell in a camped normally state, a registered PLMN (RPLMN) is included in the PLMN identity list stored in the UE, and the cell on which the UE camps is included in a logging area indicated in the area configuration information.

According to an embodiment of the present disclosure, the determining of whether the conditions for performing logged MDT are satisfied based on the report type and the Logged MDT configuration information including at least one of the PLMN identity list or the area configuration information may include determining whether a cell on which the UE camps is included in a logging area indicated in the area configuration information, and the determining of whether the cell on which the UE camps is included in the logging area indicated in the area configuration information may include: receiving a system information block type 1 (SIB1) broadcast from the cell on which the UE camps, and when the area configuration information is included in the Logged MDT configuration information, determining whether the cell on which the UE camps is included in the logging area indicated in the area configuration information included in the Logged MDT configuration information, based on the area configuration information and a PLMN identity information list included in the SIB1.

According to an embodiment of the present disclosure, the determining of whether the cell on which the UE camps is included in the logging area indicated in the area configuration information included in the Logged MDT configuration information may include: determining whether PLMN identity information included in the area configuration information is identical to PLMN identity information corresponding to a first entry of a PLMN identity list corresponding to a first entry of the PLMN identity information list included in the SIB1, and determining whether cell identity information included in the area configuration information is identical to cell identity information corresponding to the PLMN identity list corresponding to the first entry of the PLMN identity information list included in the SIB1.

According to an embodiment of the present disclosure, the determining of whether the cell on which the UE camps is included in the logging area indicated in the area configuration information included in the Logged MDT configuration information may include determining whether a new radio (NR) cell global identifier (NCGI) included in PLMN identity information in the area configuration information is identical to an NCGI included in the PLMN identity information list in the SIB1.

According to an embodiment of the present disclosure, the Logged MDT may be performed in the logging area indicated in the area configuration information.

According to another embodiment of the disclosure, an operation method of a base station in a wireless communication system may include: transmitting, to a UE, an RRC message including Logged MDT configuration information, and receiving, from the UE, a result of a measurement performed based on the Logged MDT configuration information while the UE is in an RRC IDLE mode or an RRC INACTIVE mode, wherein the result of the measurement may be stored after performing the measurement based on a configured logging interval when conditions for performing Logged MDT are satisfied, whether the conditions for performing the Logged MDT are satisfied may be determined based on the Logged MDT configuration information including at least one of a PLMN identity list or area configuration information and a report type configured for the UE, and the report type may be identified based on the Logged MDT configuration information.

According to an embodiment of the disclosure, in a case that an event type is identified as event L1 based on the Logged MDT configuration information, it is determined that the conditions for performing the Logged MDT are satisfied when the UE camps on a cell in a camped normally state, an RPLMN is included in the PLMN identity list stored in the UE, and the cell on which the UE camps is included in a logging area indicated in the area configuration information.

According to an embodiment of the disclosure, the operation method may further include transmitting SIB1 including a PLMN identity information list to the UE, and when the area configuration information is included in the Logged MDT configuration information, whether a cell on which the UE camps is included in a logging area indicated in the area configuration information included in the Logged MDT configuration information may be determined based on the area configuration information and a PLMN identity information list included in the SIB1.

According to an embodiment of the disclosure, when it is determined whether the cell on which the UE camps is included in the logging area indicated in the area configuration information included in the Logged MDT configuration information, it may be determined whether PLMN identity Information included in the area configuration information is identical to PLMN identity information corresponding to a first entry of a PLMN identity list corresponding to a first entry of the PLMN identity information list included in the SIB1, and it may be determined whether cell identity information included in the area configuration information is identical to cell identity information corresponding to the PLMN identity list corresponding to the first entry of the PLMN identity information list included in the SIB1.

According to another embodiment of the disclosure, a UE operating in a wireless communication system may include: a communicator, and at least one processor coupled with the communicator and configured to: receive, from a base station, an RRC message including Logged MDT configuration information for performing logging of a measurement result while the UE is in an RRC IDLE mode or an RRC INACTIVE mode, identify a report type configured for the UE, based on the Logged MDT configuration information, determine whether conditions for performing Logged MDT are satisfied, based on the report type and the Logged MDT configuration information including at least one of a PLMN identity list or area configuration information, when the conditions are satisfied, perform a measurement based on a configured logging interval, and perform logging of a result of the measurement.

According to an embodiment of the disclosure, the at least one processor may be further configured to: in a case that the report type is identified as being event triggered, identify an event type configured for the UE, based on the Logged MDT configuration information, and in a case that the event type is identified as event L1, determine that the conditions are satisfied when the UE camps on a cell in a camped normally state, an RPLMN is included in the PLMN identity list stored in the UE, and the cell on which the UE camps is included in a logging area indicated in the area configuration information.

According to an embodiment of the disclosure, the at least one processor may be further configured to: receive a SIB1 broadcast from a cell on which the UE camps, and when the area configuration information is included in the Logged MDT configuration information, determine whether the cell on which the UE camps is included in a logging area indicated in the area configuration information included in the Logged MDT configuration information, based on the area configuration information and a PLMN identity information list included in the SIB1.

According to an embodiment of the disclosure, the at least one processor may be further configured to: determine whether PLMN identity information included in the area configuration information is identical to PLMN identity information corresponding to a first entry of a PLMN identity list corresponding to a first entry of the PLMN identity information list included in the SIB1, and determine whether cell identity information included in the area configuration information is identical to cell identity information corresponding to the PLMN identity list corresponding to the first entry of the PLMN identity information list included in the SIB1.

According to an embodiment of the present disclosure, the Logged MDT may be performed in the logging area indicated in the area configuration information.

MODE OF DISCLOSURE

Hereinafter, embodiments of the present disclosure will be described in detail with reference to the accompanying drawings. In the following description of embodiments, descriptions of technical features that are well known in the art to which the present disclosure pertains and are not directly related to the present disclosure are omitted. This is for clearly describing the essence of the present disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In the drawings, the reference numerals refer to the same or corresponding elements throughout.

Advantages and features of the present disclosure and methods of accomplishing the same will be more readily appreciated by referring to the following description of embodiments and the accompanying drawings. However, the present disclosure should not be construed as being limited to embodiments set forth below but may be embodied in many different forms; rather, the present embodiments are provided so that the present disclosure will be thorough and complete and will fully convey the concept of the present disclosure to those of ordinary skill in the art, and the present disclosure will only be defined by the appended claims. Throughout the specification, like reference numerals refer to like elements.

It will be understood that each block of the flowchart in the drawings and combinations of blocks of the flowchart may be performed by computer program instructions. These computer program instructions may be loaded into a processor of a general-purpose computer, a special-purpose computer, or another programmable data processing equipment, and thus, the instructions performed via the processor of the computer or the other programmable data processing equipment create a means for performing functions specified in the flowchart block(s). The computer program instructions may also be stored in a computer-executable or computer-readable memory capable of directing a computer or another programmable data processing equipment to implement functions in a specific manner, and thus, the instructions stored in the computer-executable or computer-readable memory may produce an article of manufacture including instruction means for performing the functions described in the flowchart block(s). The computer program instructions may also be loaded into a computer or another programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It is also noted that, in some alternative implementations, functions described in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and performs certain operations. However, the term 'unit' is not limited to software or hardware. The 'unit' may be configured to be in an addressable storage medium or configured to operate one or more processors. Thus, the term 'unit' may include, for example, elements such as software elements, object-oriented software elements, class elements, and task elements, processes, functions, attributes, procedures, subroutines, segments of program code, drivers, firmware, micro-codes, circuits, data, a database, data structures, tables, arrays, and variables. The elements and functions provided by the 'units' may be combined into a smaller number of elements and 'units', or may be further divided into additional elements and 'units'. Furthermore, the elements and 'units' may be embodied to reproduce one or more central processing units (CPUs) in a device or security multimedia card. In addition, in an embodiment, the 'unit' may include one or more processors.

In the following description of the present disclosure, when it is determined that detailed descriptions of related known functions or configurations may unnecessarily obscure the subject matter of the present disclosure, the descriptions thereof will be omitted. Hereinafter, embodiments of the present disclosure will be described in detail with reference to the accompanying drawings.

As used in the following description, terms identifying access nodes, terms indicating network entities, terms indicating messages, terms indicating interfaces between network entities, terms indicating various types of identification information, etc. are exemplified for convenience of descriptions. Accordingly, the present disclosure is not limited to terms to be described later, and other terms representing objects having the equivalent technical meaning may be used.

Hereinafter, for convenience of descriptions, the present disclosure uses terms and names defined in the 3$^{rd}$ Generation Partnership Project Long-Term Evolution (3GPP LTE) specifications. However, the present disclosure is not limited to the terms and names but may also be identically applied to systems that comply with other standards. In the present disclosure, for convenience of descriptions, eNB may be used interchangeably with gNB. In other words, a base station (BS) described as eNB may represent gNB. Furthermore, the term 'terminal' may refer to a mobile phone, Narrowband Internet of Things (NB-IoT) devices, sensors, and other wireless communication devices.

Hereinafter, a BS is an entity that allocates resources to a terminal, and may be at least one of a next-generation Node B (gNB), an evolved Node B (eNB), a Node B, a BS, a wireless access unit, a controller, or a network node. A terminal may include a user equipment (UE), a mobile station (MS), a cellular phone, a smart phone, a computer, or a multimedia system capable of performing a communication function. However, the terminal is not limited to the above examples.

In particular, the present disclosure may be applied to the 3GPP New Radio (NR) standard (the 5th generation (5G) mobile communications standard). Furthermore, the present disclosure may be applied to intelligent services (e.g., smart homes, smart buildings, smart cities, smart cars or connected cars, health care, digital education, retail businesses, security and safety related services, etc.) based on the 5G communication technology and IoT related technology. In the present disclosure, eNB may be used interchangeably with gNB for convenience of descriptions. In other words, a BS described as eNB may represent a gNB. Furthermore, the term 'terminal' may refer to a mobile phone, narrowband IoT (NB-IoT) devices, sensors, and other wireless communication devices.

Wireless communication systems have progressed beyond providing initial voice-centered services into broadband wireless communication systems that provide high-speed, high-quality packet data services based on communication standards such as 3GPP's High Speed Packet Access (HSPA), LTE or Evolved Universal Terrestrial Radio Access (E-UTRA), and LTE-Advanced (LTE-A), LTE-Pro, 3GPP2's High Rate Packet Data (HRPD), Ultra Mobile Broadband (UMB), and IEEE's 802.16e.

As a representative example of a broadband wireless communication system, an LTE system adopts an orthogonal frequency division multiplexing (OFDM) scheme for downlink (DL) and a single carrier frequency division multiple access (SC-FDMA) scheme for uplink (UL). UL refers to a radio link through which a terminal (a UE or MS) transmits data or a control signal to a BS (or eNB), and DL refers to a radio link through which the BS transmits data or a control signal to the terminal.

Furthermore, although embodiments of the present disclosure will be described using an LTE, LTE-A, LTE Pro, or 5G (or NR that is next-generation mobile communication) system as an example, the embodiments of the present disclosure may be applied to other communication systems having similar technical backgrounds and channel configurations. It should be also understood by those skilled in the art that embodiments of the present disclosure are applicable to other communication systems through modifications not departing from the scope of the present disclosure.

FIG. 1A illustrates a structure of a next-generation mobile communication system.

Referring to FIG. 1A, a radio access network for a next-generation (NR) mobile communication system consists of a next-generation BS (NR Node B, hereinafter, gNB) 1a-10 and a NR core network, and the NR core network may include an access and mobility management function (AMF) 1a-05 but is not limited thereto. A new radio UE (hereinafter referred to as an NR UE or UE) 1a-15 may connect to an external network via the gNB 1a-10 and the AMF 1a-05.

In FIG. 1A, the gNB 1a-10 corresponds to an eNB in an existing LTE system. The gNB 1a-10 is connected to the NR UE via a radio channel and may provide superior services than an existing node B (1a-20). In the next-generation mobile communication system, because all user traffic is served through a shared channel, an entity that performs scheduling by collecting status information such as buffer states, available transmission power states, and channel states for UEs is required, and the gNB 1a-10 may be responsible for this function. One gNB 1a-10 typically controls a plurality of cells. To provide ultra-high-speed data transfer as compared to existing LTE, the next-generation mobile communication system may have bandwidths wider than the existing maximum bandwidth and utilize OFDM as a radio access technology (RAT) in conjunction with an additional beamforming technique.

Furthermore, according to an embodiment of the disclosure, the NR gNB 1a-10 may apply adaptive modulation & coding (hereinafter referred to as AMC) that determines a modulation scheme and a channel coding rate according to a channel state for a UE.

In addition, according to an embodiment of the disclosure, the AMF 1a-05 may perform functions such as mobility support, bearer configuration, quality of service (QoS) configuration, etc. The AMF 1a-05 is responsible for performing various control functions as well as mobility management for a UE and is connected to multiple BSs. Furthermore, the next-generation mobile communication system may interwork with the existing LTE system, and the AMF 1a-05 may be connected with a mobility management entity (MME) 1a-25 through a network interface. The MME 1a-25 is connected to an eNB 1a-30 that is the existing BS. The NR UE supporting LTE-NR dual connectivity may transmit and receive data while maintaining a connection to not only the gNB 1a-10 but also the eNB 1a-30.

Figure 1B:
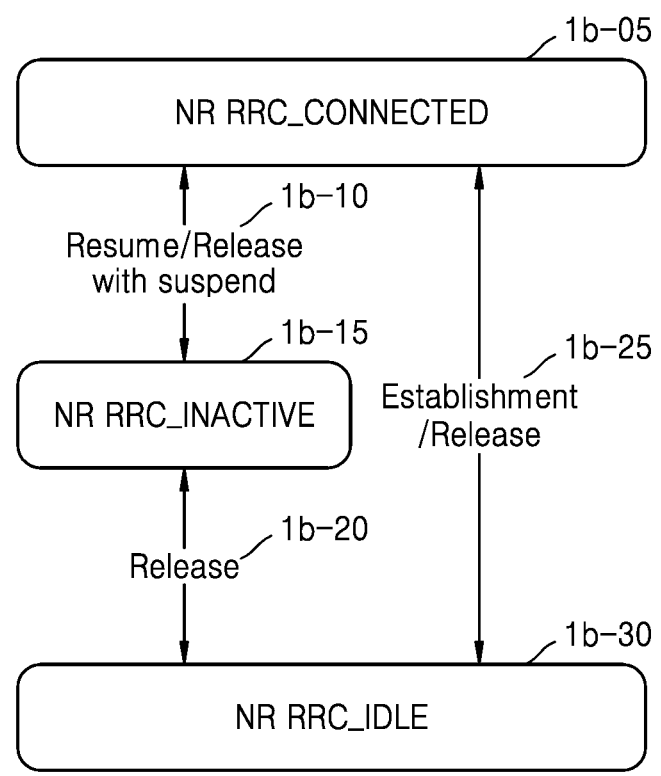
FIG. 1B is a diagram for explaining radio resource control (RRC) state transitions in a next-generation mobile communication system.

FIG. 1B is a diagram for explaining radio resource control (RRC) state transitions in a next-generation mobile communication system.

In the next-generation mobile communication system, there are three RRC states. An RRC_CONNECTED mode 1b-05 is an RRC state in which a UE can transmit and receive data. An RRC_IDLE mode 1b-30 is an RRC state in which the UE monitors whether paging is transmitted to the UE itself. The RRC_CONNECTED mode 1b-05 and the RRC_IDLE mode 1b-30 are RRC states that are also applied to the existing LTE system, and the detailed technology is the same as that of the existing LTE system.

In the next-generation mobile communication system, an RRC_INACTIVE mode 1b-15 is newly defined. In the present disclosure, the RRC_INACTIVE mode 1b-15 newly defined in the next-generation mobile communication system may correspond to an RRC inactive state, an inactive mode, a deactivation mode, or the like. In the RRC_INACTIVE mode (1b-15), a UE context is retained by a BS and the UE, and a Radio Access Network (RAN) based paging is supported. Characteristics of the RRC_INACTIVE mode 1b-15 are listed below:

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

According to an embodiment, the UE in the RRC_INACTIVE mode 1b-15 may move to the RRC_CONNECTED mode 1b-05 or the RRC_IDLE mode 1b-30 by using a specific procedure. According to a resume procedure, the UE transitions from the RRC_INACTIVE mode 1b-15 to the RRC_CONNECTED mode 1b-05, and transitions from the RRC_CONNECTED mode 1b-05 to the RRC_INACTIVE mode 1b-15 by using a release procedure including suspend configuration information (1b-10). The above-described procedure 1b-10 may be composed of one or more operations so that one or more RRC messages may be transmitted and received between the UE and the BS.

Furthermore, through the resume and release procedure, the UE may transition from the RRC_INACTIVE mode 1b-15 to the RRC_IDLE mode 1b-30 (1b-20).

The transition between the RRC_CONNECTED mode 1b-05 and the RRC_IDLE mode 1b-30 is performed using the existing LTE technology. In other words, through an establishment or release procedure, a transition between the RRC_CONNECTED mode 1b-05 and the RRC_IDLE mode 1b-30 may be performed (1b-25).

Figure 1C:
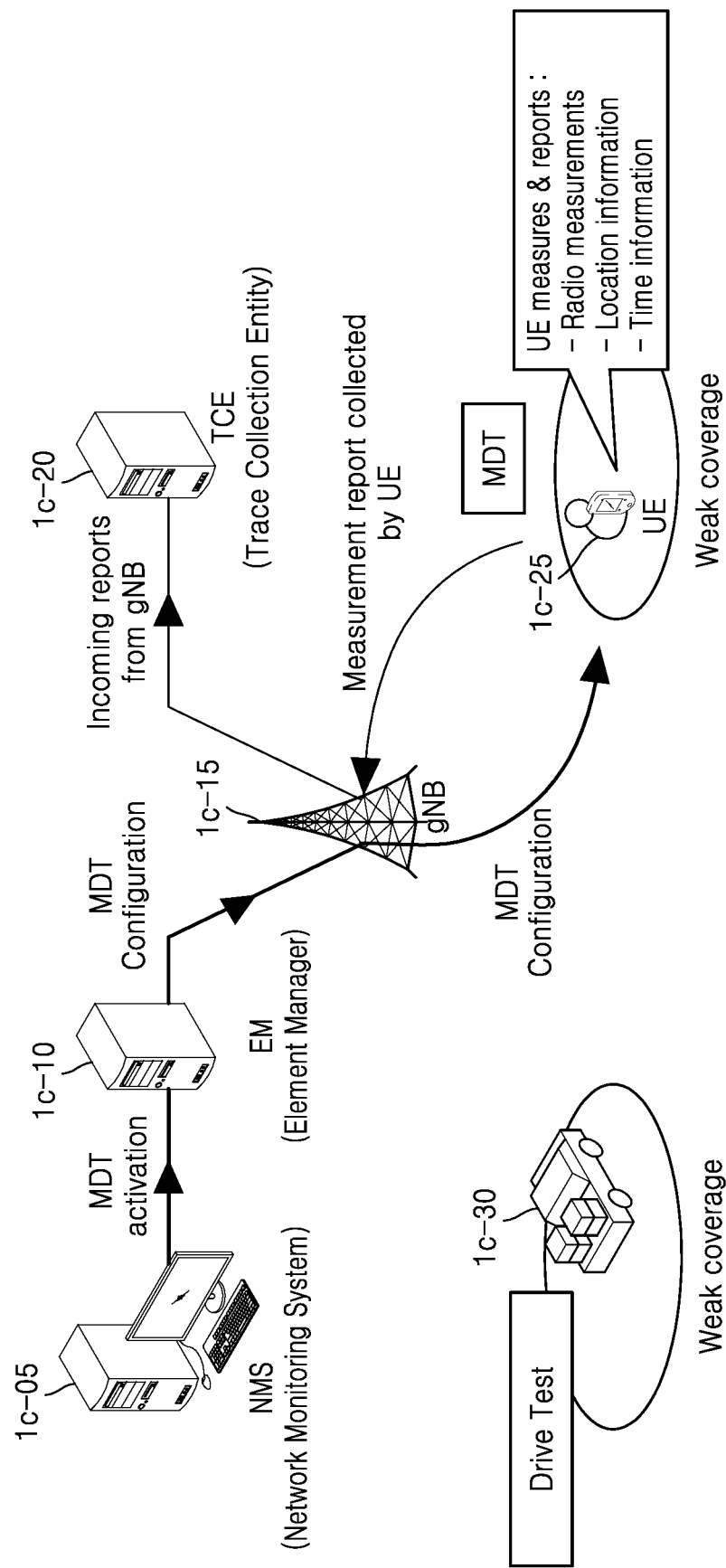
FIG. 1C is a diagram for explaining a technique for collecting and reporting cell measurement information, according to an embodiment of the present disclosure.

FIG. 1C is a diagram for explaining a technique for collecting and reporting cell measurement information, according to an embodiment of the present disclosure.

When constructing or optimizing a network, a mobile communication service provider (hereinafter referred to as an operator) typically measures a signal strength in an expected service area, and performs a procedure of deploying BSs in the service area or readjusting the deployment based on the measured signal strength. The operator collects cell measurement information in the service area with signal measurement equipment carried on a vehicle, which is time consuming and expensive. The process of collecting the cell measurement information is commonly referred to as a drive test 1c-30 because it generally involves the use of a vehicle.

A UE 1c-25 has a function of measuring a signal and transmitting a measurement result to a BS in order to support operations such as cell reselection, handover, and serving cell addition when moving through cells. Therefore, instead of performing the above-described drive test, the UE 1c-25 in the service area may be utilized, which may be defined as minimization of drive test (MDT). The operator may configure MDT operations for specific UEs through various components of the network. In addition, the UEs may collect and store signal strength information from a serving cell and neighboring cells while in an RRC_CONNECTED mode, an RRC_IDLE mode, or an RRC_INACTIVE mode. In addition, the UEs may also store various pieces of information together, such as location information, time information, signal quality information, etc. Information that the UEs can store is not limited to the above-described examples. When the UEs are in the RRC_CONNECTED mode, the information stored in the UEs may be reported to the network and transmitted to a specific server.

The above-described MDT operations may be largely classified into Immediate MDT and Logged MDT.

Immediate MDT is characterized by reporting collected information immediately to the network. Because the UE needs to immediately report the collected information to the network, only a UE in the RRC_CONNECTED mode can perform the Immediate MDT. As an example, Immediate MDT may be performed by applying existing Radio Resource Management (RRM) measurement processes for supporting operations such as handover and serving cell addition, and location information, time information, etc. may be additionally reported to the network.

Logged MDT involves storing information collected by a UE without directly reporting the collected information immediately to the network and then reporting the information stored by the UE after the UE transitions to the RRC_CONNECTED mode. As an example, a UE in an RRC_IDLE mode that cannot immediately report the collected information to the network may perform Logged MDT. A UE in an RRC_INACTIVE mode newly introduced in the next-generation mobile communication system may perform the Logged MDT. When a specific UE is in the RRC_CONNECTED mode, the network may provide configuration information for performing a Logged MDT operation to the UE in the RRC_CONNECTED mode. In addition, the UE may collect and store configured information after transitioning to the RRC_IDLE mode or RRC_INACTIVE mode.

Table 1 below is a table summarizing an MDT mode (Immediate MDT or Logged MDT) that a UE can perform according to its RRC state.

TABLE 1

| MDT | RRC state |
| --- | --- |
| Immediate MDT | RRC_Connected |
| Logged MDT | RRC_Idle, RRC_Inactive |

Figure 1D:
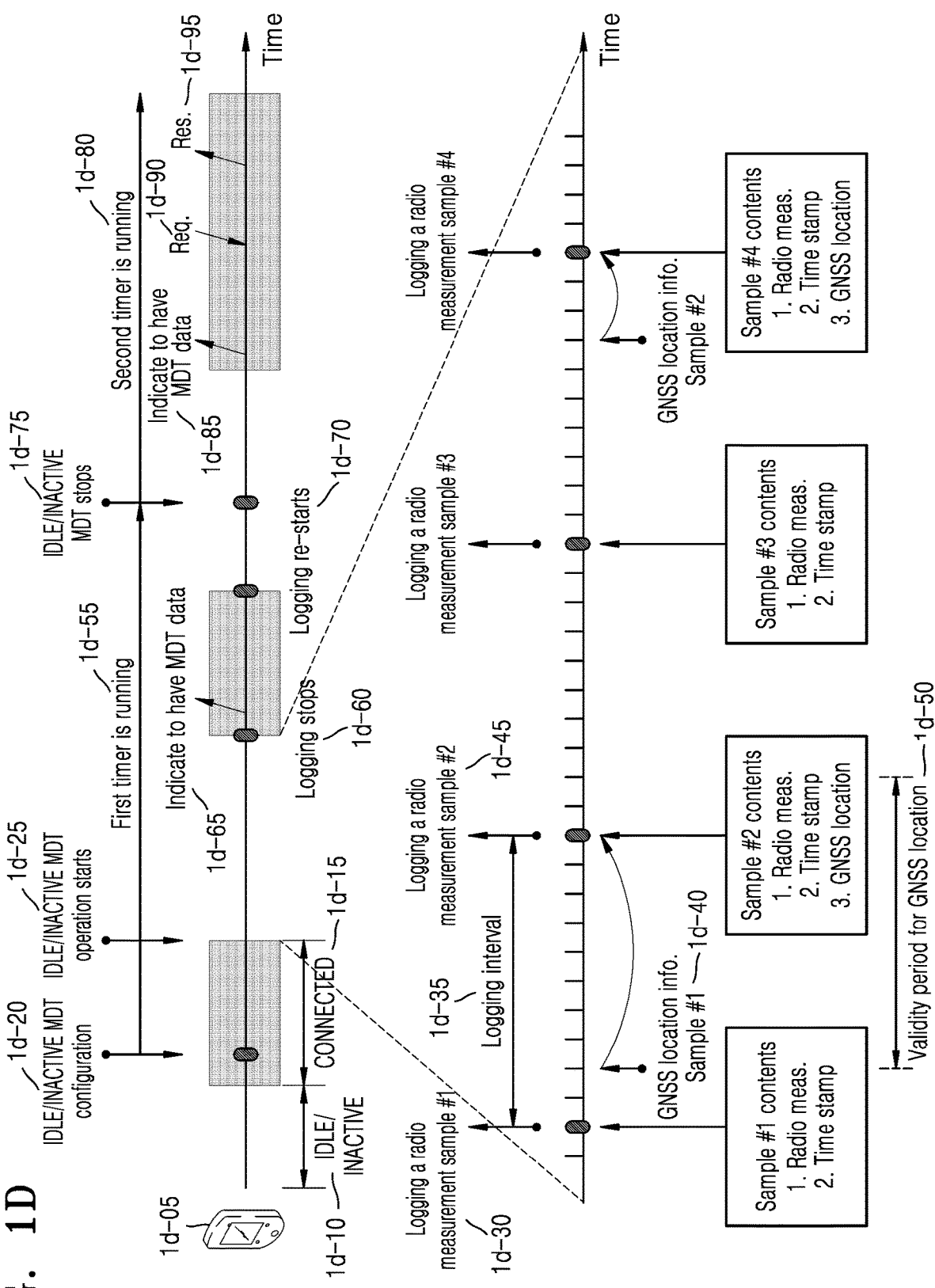
FIG. 1D is a diagram illustrating a method of collecting and reporting cell measurement information, according to an embodiment of the present disclosure.

FIG. 1D is a diagram illustrating a method of collecting and reporting cell measurement information, according to an embodiment of the present disclosure.

A UE 1d-05 may transition from an RRC_IDLE or RRC_INACTIVE mode 1d-10 to an RRC_CONNECTED mode 1d-15. The UE 1d-05 in the RRC_CONNECTED mode 1d-15 may collect MDT data and report it to a BS through an immediate MDT operation.

The UE 1d-05 that transitions to the RRC_CONNECTED mode 1d-15 may receive, from the BS, Logged MDT configuration information (IDLE/INACTIVE MDT configuration) performed in the RRC_IDLE or RRC_INACTIVE mode (1d-20). The Logged MDT configuration information may be included in a certain RRC message and transmitted to the UE. Upon receiving the RRC message, the UE may start a first timer (1d-55).

The UE may continue to perform the Logged MDT operation in the RRC_IDLE or RRC_INACTIVE mode until the first timer expires. A value of the first timer may be included in the Logged MDT configuration information. When transitioning to the RRC_IDLE or RRC_INACTIVE mode, the UE performs Logged MDT according to the received Logged MDT configuration information (1d-25). The UE may store certain information collected for each configured time period (e.g., a logging interval) 1d-35 (1d-30 and 1d-45).

Also, if the UE 1d-05 has collected valid location information (e.g., global navigation satellite system (GNSS) location information) 1d-40, the UE 1d-05 also needs to store the valid location information. If a predetermined time period (e.g., a validity period for GNSS location) 1d-50 does not elapse from the time when the above-described location information is collected, the location information may be determined to be valid. The predetermined time period 1d-50 for determining whether the location information is valid may be shorter than or equal to the logged interval (or logging interval) 1d-35.

Even before the first timer expires, when the UE 1d-05 transitions to the RRC_CONNECTED mode, the UE 1d-05 may temporarily stop the Logged MDT operation being performed (1d-60). However, the first timer may continue to run without stopping even during an interval of the RRC_CONNECTED mode. In other words, the first timer may continue to run regardless of an RRC state transition. However, when a UE's memory capacity for storing MDT data is insufficient so that the UE can no longer store data, or when the Logged MDT configuration information is released, the first timer may be stopped. For example, the UE may release the Logged MDT configuration information when receiving other Logged MDT configuration information in serving RAT or another RAT or upon detach or power off. During RRC Connection Establishment or RRC Connection Resume, the UE 1d-05 may report to the BS that the UE 1a-05 has collected data (MDT data) stored therein by using an RRC Setup Complete message or RRC Resume Complete message (1d-65).

The RRC Connection Establishment is a procedure in which the UE 1d-05 transitions from the RRC_IDLE mode to the RRC_CONNECTED mode. As described below, the RRC Connection Establishment generally consists of three steps, and three types of RRC messages are used.

Step 1: The UE transmits an RRC Setup Request message to the BS.

Step 2: The BS transmits an RRC Setup message to the UE.

Step 3: The UE transmits an RRC Setup Complete message to the BS.

The RRC Connection Resume is a procedure in which the UE 1d-05 transitions from the RRC_INACTIVE mode to the RRC_CONNECTED mode. As described below, the RRC Connection Resume generally consists of three steps, and three types of RRC messages are used.

Step 1: The UE transmits an RRC Resume Request message to the BS.

Step 2: The BS transmits an RRC Resume message to the UE.

Step 3: The UE transmits an RRC Resume Complete message to the BS.

As described above, the UE 1d-05 may report information indicating that it has collected information (MDT data) to the BS during the RRC Connection Establishment or RRC Connection Resume. Furthermore, as another example, the UE 1d-05 may report information indicating that it has collected information (MDT data) to a target BS during the RRC Connection Reestablishment and handover.

According to an embodiment of the present disclosure, when Logged MDT is configured but there is no collected and stored information yet, the UE 1d-05 omits the above-described reporting process.

Upon receiving the report (the information indicating that the UE 1d-05 has the collected information (MDT data)), the BS may request the UE 1d-05 to report the MDT data stored by the UE 1d-05, when necessary. MDT data that is not reported needs to be continuously stored by the UE 1d-05 for a predetermined time period. If the UE transitions back to the RRC_IDLE mode or the RRC_INACTIVE mode, and the first timer has not yet expired, the UE 1d-05 may resume the Logged MDT operation (1d-70).

When the first timer expires, the UE 1d-05 may stop the Logged MDT operation (1d-75). The UE 1d-05 that has stopped the logged MDT operation may start a second timer (1d-80), and retain stored MDT data until the second timer expires. After the second timer expires, whether to discard the stored MDT data may be determined via the UE implementation. According to an embodiment of the present disclosure, a value of the second timer may be included in the Logged MDT configuration information, or a predefined value may be applied without being configured.

When the UE 1d-05 transitions back to the RRC_CONNECTED mode, the UE 1d-05 may report to the BS that it has the collected information (MDT data) stored therein (1d-85). Thereafter, the BS may request the UE 1d-05 to report the MDT data stored by the UE 1d-05 by using a certain RRC message (1d-90). The UE 1d-05 may then receive (or include) the stored MDT data in the certain RRC message, and report the RRC message to the BS (1d-95).

Figure 1E:
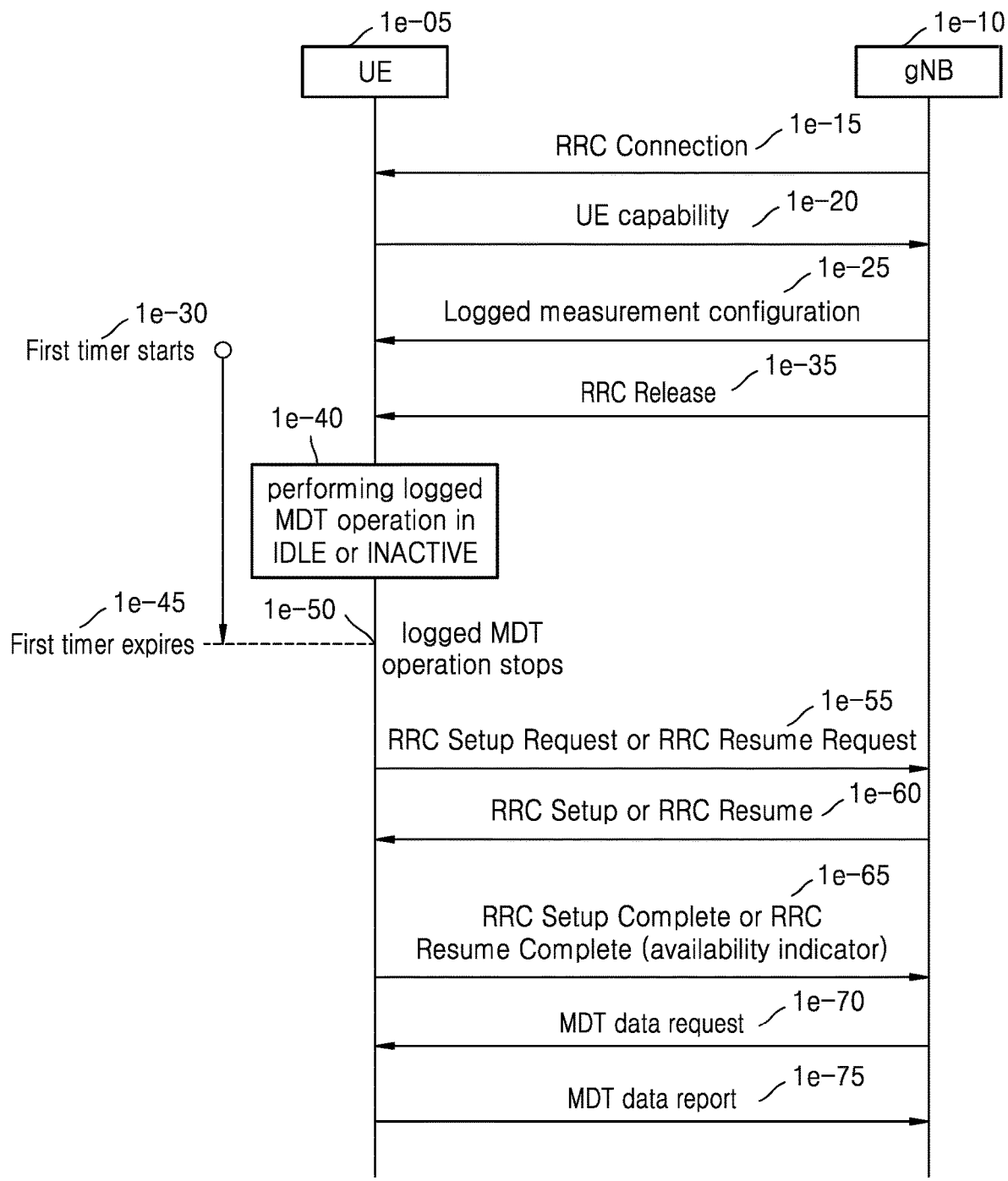
FIG. 1E is a flowchart of an operation of collecting and reporting cell measurement information, according to an embodiment of the present disclosure.

FIG. 1E is a flowchart of an operation of collecting and reporting cell measurement information, according to an embodiment of the present disclosure.

A UE 1e-05 may establish a connection with a BS (e.g., gNB) 1e-10 (1e-15). The UE 1e-05 may provide UE capability information to the BS 1e-10 (1e-20) and indicate whether the UE 1e-05 supports an MDT operation and a frequency for which the UE 1e-05 can perform measurements. The BS 1e-10 may include configuration information necessary to perform a Logged MDT operation in a certain RRC message and transmit it to the UE 1e-05 (1e-25). For example, the configuration information may include at least one of the following information:

Trace Reference information

Trace Recording Session Reference information

Trace Collection Entity (TCE) ID information: The BS transmits MDT data information reported from the UE to a data server designated by a TCE ID.

Absolute time information: Absolute time in the current cell providing the Logged MDT configuration information Area Configuration: This indicates information about an area where measurement information can be collected and stored through the Logged MDT operation, and the area is indicated in a cell unit. The information may also include information about a RAT in which measurement information should be collected. A list included in the RAT information may be a black list or a white list. If the list is a black list, cell measurement information is collected for RATs not included in the list. If the list is a white list, cell measurement information is not collected for RATs not included in the list.

Logging Duration: This is a value of the first timer described above, and when the first timer is running, the UE performs a Logged MDT operation in an RRC_IDLE or RRC_INACTIVE mode.

Logging Interval: This is a period for which collected information is stored.

plmn-IdentityList (i.e. MDT PLMN list): This indicates Public Land Mobile Network (PLMN) list information, and includes information about PLMNs where the Logged MDT operation as well as reporting of whether MDT data is stored and reporting of the MDT data can be performed.

An indicator indicating whether the UE performs the Logged MDT operation in the RRC_IDLE mode, the RRC_INACTIVE mode, or both of them. For example, by using this indicator, an RRC state in which the Logged MDT operation is performed may be indicated. As another example, without the indicator, it may be defined that the UE always performs the Logged MDT operation in the RRC_IDLE mode and in the RRC_INACTIVE mode. The UE performs the Logged MDT operation only in the RRC state indicated by this indicator.

An indicator indicating whether to collect and store beam level measurement information. A beam antenna may be applied in a next-generation mobile communication system. As an example, without this indicator, it may be defined that beam level measurements are always collected and stored for a frequency at which a beam-based operation is performed.

Information about a maximum number of beams collected or stored, and minimum signal strength information of the stored beams The UE may omit storage of information about a beam having a signal strength less than the minimum signal strength of the stored beams. If all the beams have a signal strength less than a configured minimum signal value, the UE may store information about a beam having a strongest signal strength among the beams or include an indicator indicating that all the beams have a signal strength less than the configured minimum signal value.

An indicator indicating whether an MDT retrieval operation can be triggered in 2-step RRC Resume.

Upon receiving the Logged MDT configuration information, the UE 1e-05 may start a first timer (1e-30). A value of the first timer may be configured to be equal to a value of Logging Duration.

The BS 1e-10 may cause the UE 1e-05 to move to the RRC_IDLE or RRC_INACTIVE mode by using an RRC Release message (1e-35). According to an RRC state to which the UE 1e-05 moves, the RRC Release message may include configuration information for an operation of the UE 1e-05 in the selected RRC state.

When the first timer is running, the UE 1e-05 may perform a Logged MDT operation in the RRC_IDLE or RRC_INACTIVE mode (1e-40).

According to an embodiment of the present disclosure, the UE 1e-05 may measure signal strengths for a serving cell and neighboring cells, and obtain location information. When beam-level measurement is configured, the UE 1e-05 may collect and store signal strength values for a beam greater than a configured minimum value (a minimum signal value) in the serving cell and the neighboring cells. The maximum number of beams that can be stored may be configured or predefined. In the present disclosure, a signal strength may be a Reference Signal Received Power (RSRP), Reference Signal Received Quality (RSRQ), or a Signal-to-interference-plus-noise ratio (SINR), but is not limited thereto.

The UE 1e-05 may store the collected information for each logged interval.

When the first timer expires (1e-45), the UE 1e-05 may stop the Logged MDT operation (1e-50).

In a case that the UE 1e-05 is in the RRC_IDLE or RRC_INACTIVE mode via the RRC Release message in operation 1e-35 described above and receives RAN paging or core network (CN) paging from the BS, or mobile originated (MO) data transmission is activated, the UE 1e-05 may initiate an establishment or resume procedure for transitioning from the RRC_IDLE or RRC_INACTIVE mode to the RRC_CONNECTED mode.

The establishment or resume procedure may be composed of the following steps:

Step 1: The UE 1e-05 transmits an RRC Setup Request message or an RRC Resume Request message to the BS 1e-10 (1e-55).

Step 2: The BS 1e-10 transmits an RRC Setup message or an RRC Resume message to the UE 1e-05 (1e-60).

Step 3: The UE 1e-05 transmits an RRC Setup Complete message or an RRC Resume Complete message to the BS 1e-10 (1e-65).

According to an embodiment of the present disclosure, the UE 1e-05 may include an indicator indicating the availability of MDT data stored therein in the RRC Setup Complete or RRC Resume Complete message.

Upon receiving the RRC Setup Complete message, the BS 1e-10 may request, when necessary, the UE 1e-05 to report the MDT data by using a certain RRC message (1e-70). Upon receiving the request from the BS 1e-10, the UE 1e-05 may report the MDT data to the BS 1e-10 by using a certain RRC message (1e-75).

Figure 1F:
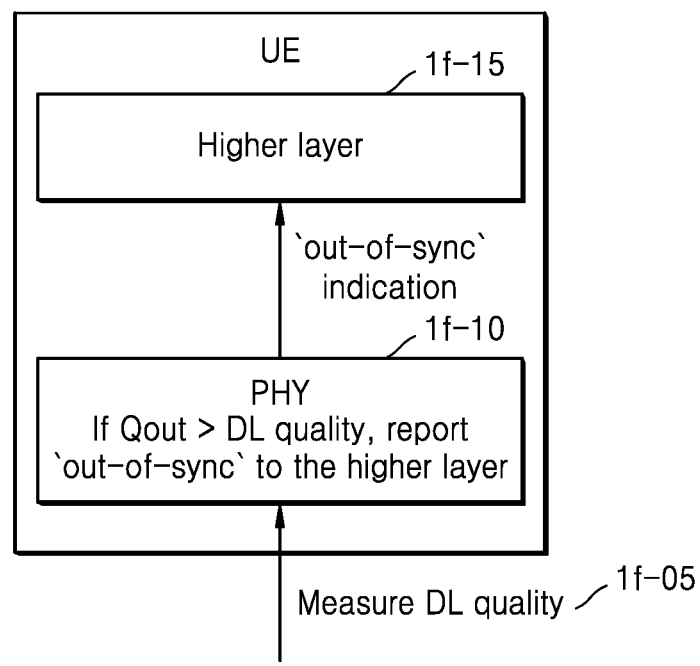
FIG. 1F is a diagram for explaining a Radio Link Monitoring (RLM) operation according to an embodiment of the present disclosure.

FIG. 1F is a diagram for explaining a Radio Link Monitoring (RLM) operation according to an embodiment of the present disclosure.

A physical layer of the UE may measure DL signal quality from a cell-specific reference signal (CRS) of a serving cell (1f-05). The physical layer of the UE may determine whether the DL signal quality is lower than (or less than) Qout, which is a specific threshold (1f-10). In this case, for example, the threshold may mean a signal quality value corresponding to a specific block error rate (BLER) measured in a physical downlink control channel (PDCCH).

If the DL signal quality is lower than the specific threshold Qout, the physical layer may transmit an 'out-of-sync' indication to a higher layer. In LTE technology, this operation is referred to as RLM. If 'out-of-sync' indications are transmitted to the higher layer more than a specific number of times, the higher layer may start a specific timer, and declare a Radio Link Failure (RLF) when the timer expires (1f-15).

Figure 1G:
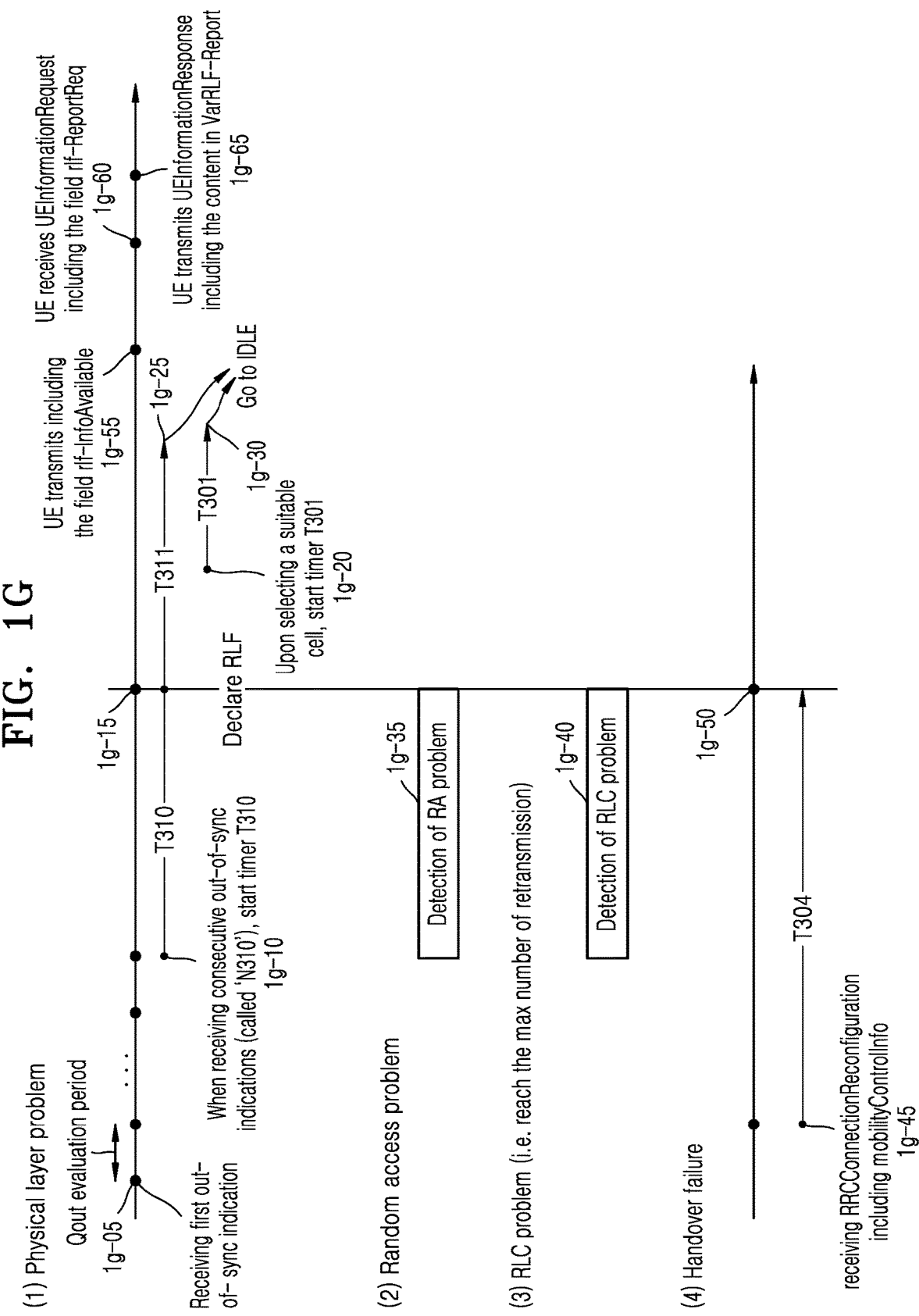
FIG. 1G is a diagram for explaining a Radio Link Failure (RLF) operation and a RLF report according to an embodiment of the present disclosure.

FIG. 1G is a diagram for explaining an RLF operation according to an embodiment of the present disclosure.

As described above, an RLF may be declared according to a result of an RLM operation. A physical layer of a UE may determine, based on a CRS of a serving cell, whether DL signal quality is lower than a specific threshold Qout for each specific period (e.g., Qout evaluation period). If the DL signal quality is lower than the specific threshold Qout, the physical layer may transmit an 'out-of-sync' indication to a higher layer.

When a first 'out-of-sync' indication is transmitted to the higher layer (1g-05) and then 'out-of-sync' indications are transmitted to the higher layer a specific number of times (e.g., N310), the higher layer may start a specific timer (e.g., timer T310) (1g-10).

The physical layer may also determine whether the DL signal quality is higher than a specific threshold Qin, based on the CRS of the serving cell. If the DL signal quality is higher than a specific threshold Qin, the physical layer may transmit an 'in-sync' indication to the higher layer. When 'in-sync' indications are transmitted to the higher layer a specific number of times, the higher layer may stop a running T310 timer. If the T310 timer is not stopped but expires, the higher layer may declare an RLF (1g-15).

After RLF declaration, the UE may start another timer T311. The UE may search for a new suitable cell. If the UE fails to find a new suitable cell until timer T311 expires, the UE may transition to the RRC_IDLE mode (1g-25).

If the UE finds a new suitable cell before the timer T311 expires, the UE may start timer T301 and perform a re-establishment procedure with the new suitable cell (1g-20).

According to an embodiment of the present disclosure, if the re-establishment is not successfully completed before the timer T301 expires, the UE may move to the RRC_IDLE mode (1g-30).

According to an embodiment of the present disclosure, if the re-establishment is successful, the UE may remain in the RRC_CONNECTED mode for the cell (e.g., the new suitable cell). RLF may be declared by this RLM operation, or may be declared according to another condition. For example, RLF may also be declared when random access (RA) fails (1g-35).

In addition, RLF may also be declared in a case that a packet is not successfully transmitted even if the maximum number of retransmissions has been reached in a Radio Link Control (RLC) layer (1g-40). Operations of the timers T301 and T311 are described in the Table 2 below.

TABLE 2

| Timer | Start | Stop | At expiry |
|---|---|---|---|
| T301 | Upon transmission of RRCReestablishmentRequest | Upon reception of RRCReestablishment or RRCSetupmessage as well as when the selected cell becomes unsuitable | Go to RRC_IDLE |

TABLE 2-continued

| Timer | Start | Stop | At expiry |
|---|---|---|---|
| T311 | Upon initiating the RRC connection re-establishment procedure | Upon selection of a suitable NR cell or a cell using another RAT. | Enter RRC_IDLE |

RLF is also declared in case of a handover failure. Upon receiving an RRCConnectionReconfiguration message including mobilityControlInfo information element (IE) and handover configuration information (1g-45), the UE may start timer T304. A configured time value of the timer T304 may be provided by mobilityControlInfo. If RA with a target cell is not successfully completed before the timer T304 expires, the UE may consider it as a handover failure and declare an RLF (1g-50).

A plurality of pieces of predetermined information collected by the UE when an RLF occurs are useful for optimizing a cell area. Therefore, the plurality of pieces of information are stored in the UE when the RLF occurs, and then reported to the BS when the UE successfully transitions to the RRC_CONNECTED mode. In this case, report of the predetermined information stored in the UE to the BS is referred to as RLF report, and the information reported at this time is as follows. In this case, information related to an RA procedure may also be stored together.

plmn-IdentityList
measResultLastServCell
measResultNeighCells
locationInfo
failedPCellId
previousPCellId
timeConnFailure
Cell Radio-Network Temporary Identifier (C-RNTI) used in the source PCell
connectionFailureType
absoluteFrequencyPointA: absolute frequency position of the reference resource block (Common RB 0)
locationAndBandwidth: Frequency domain location and bandwidth of the bandwidth part (BWP) associated to the random-access resources used by the UE
subcarrierSpacing: Subcarrier spacing used in the BWP associated to the random-access resources used by the UE
msg1-FrequencyStart: Offset of lowest Physical Random Access Channel (PRACH) transmission occasion in frequency domain with respective to PRB 0 of the UL BWP
msg1-SubcarrierSpacing: Subcarrier spacing of PRACH resources
msg1-FDM: The number of PRACH transmission occasions FDMed in one time instance
raPurpose: the RA scenario for which the RA report entry is triggered
perRAInfoList: detailed information about each of the RA attempts in the chronological order of the RA attempts, such as a synchronization signal block (SSB) index related to preamble transmission, the number of preamble transmissions per SSB, whether contention occurs, etc.

When the UE transitions to the RRC_CONNECTED mode through an RRC establishment or RRC resume procedure, the UE may report the availability of the stored RLF report to the BS by using a certain RRC message such as an RRCSetupComplete message, an RRCResumeComplete message, or the like (1g-55).

The BS may indicate to the UE that the UE shall report the RLF report by using a UEInformationRequest message (1g-60). The UE may report a UEInformationResponse message including the RLF report to the BS (1g-65).

Figure 1H:
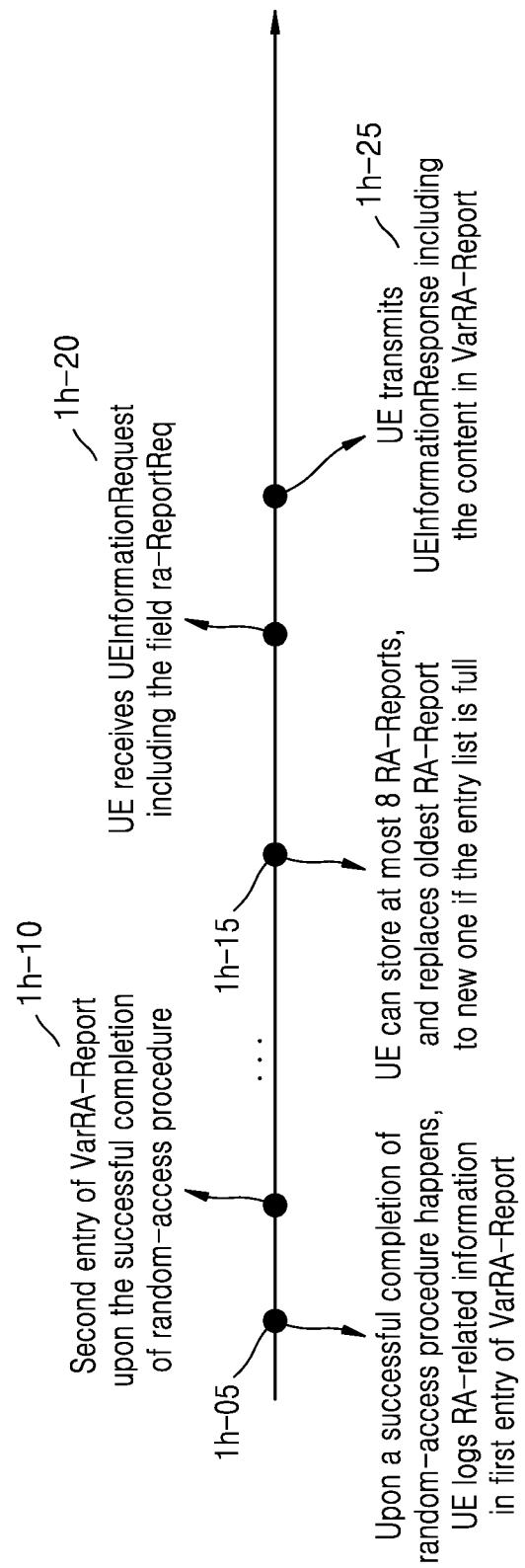
FIG. 1H is a diagram for explaining a random access (RA) report according to an embodiment of the present disclosure.

FIG. 1H is a diagram for explaining an RA report according to an embodiment of the present disclosure.

For successfully completed RA, the UE may store RA-related information in VarRA-Report which is an internal variable in the UE (1h-05). This is referred to as one RA report. Information related to an RA report is as follows.

CellId: CGI of the cell in which the associated RA procedure was performed absoluteFrequencyPointA: absolute frequency position of the reference resource block (Common RB 0)

locationAndBandwidth: Frequency domain location and bandwidth of the BWP associated to the random-access resources used by the UE subcarrierSpacing: Subcarrier spacing used in the BWP associated to the random-access resources used by the UE msg1-FrequencyStart: Offset of lowest PRACH transmission occasion in frequency domain with respective to PRB 0 of the UL BWP msg1-SubcarrierSpacing: Subcarrier spacing of PRACH resources msg1-FDM: The number of PRACH transmission occasions FDMed in one time instance raPurpose: the RA scenario for which the RA report entry is triggered perRAInfoList: detailed information about each of the RA attempts in the chronological order of the RA attempts In addition, when storing the above-described information, the UE may store an Equivalent PLMN (EPLM) list if it has stored EPLMN information, but otherwise, store selected PLMN information together.

Upon successful completion of another RA procedure after storing the RA information, the UE may store information related to the newly successful RA (1h-10). In this case, if a registered PLMN (RPLMN) is included in the stored PLMN information, the stored PLMN information may be updated with the currently stored EPLMN information for storage. If the RPLMN is not included in the stored PLMN information, all information stored in the VarRA-Report may be discarded.

According to an embodiment of the present disclosure, the UE may store at most 8 RA reports. When eight RA reports are already stored, and a new RA procedure is successfully completed, the UE may delete the oldest RA report and store information related to the newly successful RA procedure (1h-15).

After the UE transitions to the RRC_CONNECTED mode, the BS may request RA report information stored in the UE from the UE using a certain RRC message (1h-20). At this time, if the UE has stored a RA report and the RPLMN is included in the stored PLMN information, the UE may report the stored RA report to the BS using a certain RRC message (1h-25). All the reported RA report information may be discarded from the VarRA-Report.

Figure 1I:
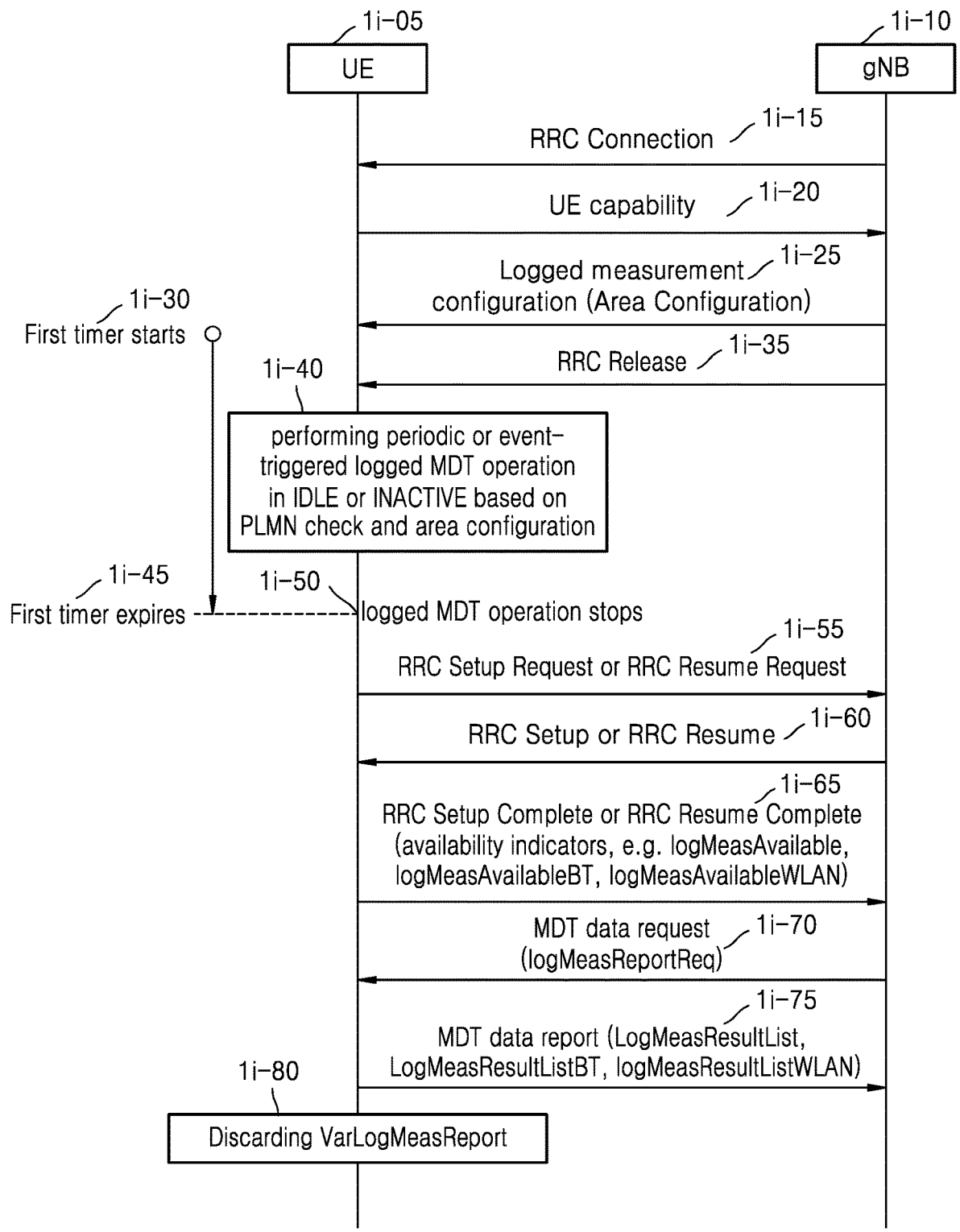
FIG. 1I is a flowchart of an operation of collecting and reporting cell measurement information by taking into account a Public Land Mobile Network (PLMN) and area configuration, according to an embodiment of the present disclosure.

FIG. 1I is a flowchart of an operation of collecting and reporting cell measurement information by taking into account a PLMN and area configuration, according to an embodiment of the present disclosure.

A UE 1i-05 establishes a connection (RRC connection) with a BS 1i-10 (1i-15). The UE 1i-05 may provide UE capability information to the BS 1i-10 (1i-20) and indicate whether the UE 1i-05 supports an MDT operation and a frequency for which the UE 1l-05 can perform measurements. The BS 1i-10 may include configuration information necessary to perform a Logged MDT operation in a certain RRC message and transmit it to the UE 1i-05 (1i-25). For example, the configuration information may include at least one of the following information:

Trace Reference information

Trace Recording Session Reference information

Trace Collection Entity (TCE) ID information: The BS transmits MDT data information reported from the UE to a data server designated by a TCE ID.

Absolute time information: Absolute time in the current cell providing the Logged MDT configuration information Area Configuration: This indicates information about an area where measurement information can be collected and stored through the MDT operation, and the area is indicated in a cell unit, a tracking area code (TAC) unit, or tracking code identity (TAI) unit. An Abstract Syntax Notation One (ASN.1) structure of Area Configuration is as follows.

```
AreaConfigForServing-r16 : :=      CHOICE {
   cellGlobalIdList-r16            CellGlobalIdList-r16,
   trackingAreaCodeList-r16        TrackingAreaCodeList-r16,
   trackingAreaIdentityList-r16    TrackingAreaIdentityList-r16
}
```

When Area Configuration is indicated in a cell unit, it is indicated by a NR Cell Global Identifier (NCGI) value and consists of one plmn-Identity (a field indicating one PLMN ID) and one cellIdentity. A logging area may also be indicated by a TAC or TAI. TAI consists of one plmn-Identity and one TAC.

```
CellGlobalIdList-r16 ::=       SEQUENCE (SIZE (1 .. 32)) OF CGI-Info-Logging-r16
TrackingAreaCodeList-r16 ::=   SEQUENCE (SIZE (1 .. 8)) OF TrackingAreaCode
TrackingAreaIdentityList-r16 ::=   SEQUENCE (SIZE (1 .. 8)) OF TrackingAreaIdentity-r16
TrackingAreaIdentity-r16 ::= SEQUENCE {
plmn-Identity-r16         PLMN-Identity,
trackingAreaCode-r16      TrackingAreaCode
```

Logging Duration: This is a value of the first timer described above, and when the first timer is running, the UE performs a Logged MDT operation in an RRC_IDLE or RRC_INACTIVE mode.

Logging Interval: This is a period for which collected information is stored.

plmn-IdentityList (i.e. MDT PLMN list): This is PLMN list information, and includes information about PLMNs where the Logged MDT operation as well as reporting of whether MDT data is stored and reporting of the MDT data is allowed.

An indicator indicating whether the UE performs the Logged MDT operation in the RRC_IDLE mode, the RRC_INACTIVE mode, or both of them. For example, by using this indicator, an RRC state in which the Logged MDT operation is performed may be indicated. As another example, without the indicator, it may be defined that the UE always performs the Logged MDT operation in the RRC_IDLE mode and in the RRC_INACTIVE mode. The UE performs the Logged MDT operation only in the RRC state indicated by this indicator.

An indicator indicating whether to collect and store beam level measurement information. A beam antenna may be applied in a next-generation mobile communication system. For example, without this indicator, it may be defined that beam level measurements are always collected and stored for a frequency on which a beam-based operation is performed.

Information about a maximum number of beams collected or stored, and minimum signal strength information of the stored beams. The UE may omit storage of information about a beam having a signal strength less than the minimum signal strength of the stored beams. If all the beams have a signal strength less than a configured minimum signal value, the UE may store information about a beam having a strongest signal strength among the beams or include an indicator indicating that all the beams have a signal strength less than the set minimum signal value.

An indicator indicating whether an MDT retrieval operation can be triggered in 2-step RRC Resume.

reportType: An indicator indicating whether MDT is periodic logged MDT or event-triggered periodic logged MDT. In case of the event-triggered periodic logged MDT, only one of out-of-coverage and an Event A2 condition may be configured.

Upon receiving the Logged MDT configuration information, the UE 1i-05 may start a first timer (1i-30). A value of the first timer may be configured to be equal to a value of Logging Duration.

The BS 1i-10 may cause the UE 1i-05 to move to an RRC_IDLE or RRC_INACTIVE mode by using an RRC Release message (1i-35). According to an RRC state to which the UE 1i-05 moves, the RRC Release message may include configuration information for an operation of the UE 1i-05 in the selected RRC state.

If the first timer is running, the UE 1i-05 performs periodic logged MDT or event-triggered logged MDT in the RRC_IDLE or RRC_INACTIVE mode when all the following conditions are satisfied (1i-40).

If the UE is camping on an NR cell in a camped normally state,

If an RPLMN for the UE is configured as above and included in the plmn-IdentityList stored by the UE, and If the NR cell on which the UE is currently camping belongs to an area indicated by the area configuration, to check whether the NR cell belongs to the area indicated by the area configuration, the UE receives system information block type 1 (SIB1) being broadcast from the NR cell. A list of PLMNs supported by the corresponding cell is received in the SIB1. In an NR system, there may be a plurality of NCGIs indicating one cell. An NR BS may store ID information of the NR cell in PLMN-IdentityInfoList IE in SIB1, as defined below, and provide it to the UE. An operator may be provided with cellIdentity field corresponding to each PLMN, together with a plurality of PLMNs. An NCGI is a combination of a PLMN and NCI indicated by cellIdentity corresponding thereto. Thus, there may be several NCGIs indicating one cell. The reason that the NR system is developed so that each operator can have a plurality of cell IDs is to efficiently operate cells when sharing networks between operators. A TAC value is included for each PLMN-IdentityInfo.

PLMN-IdentityInfoList

The IE PLMN-IdentityInfoList includes a list of PLMN identity information.

| PLMN-IdentityInfoList information element |  |
|---|---|
| -- ASN1START |  |
| -- TAG-PLMN-IDENTITYINFOLIST-START |  |
| PLMN-IdentityInfoList ::= | SEQUENCE (SIZE (1. . maxPLMN) ) OF PLMN-IdentityInfo |
| PLMN-IdentityInfo : := | SEQUENCE { |
|   plmn-IdentityList |   SEQUENCE (SIZE (1. . maxPLMN) ) OF PLMN-Identity, |
|   trackingAreaCode |   TrackingAreaCode |
|     OPTIONAL,  -- Need R |  |
|   ranac |   RAN-AreaCode |
|     OPTIONAL,  -- Need R |  |
|   cellIdentity |   CellIdentity, |
|   cellReservedForOperatorUse |   ENUMERATED {reserved, notReserved}, |
|   ... |  |
| } |  |
| -- TAG-PLMN-IDENTITYINFOLIST-STOP |  |
| -- ASN1STOP |  |

Therefore, as shown in Table 3 below, it is necessary to define which value among the plurality of NCGIs and the plurality of PLMNs supported by the NR cell has to be compared with a cell and TAI indicated by Area Configuration.

TABLE 3

|  | AreaConfig | SIB1 |
|---|---|---|
| CellGlobalIdList | N * [PLMN identity + cell identity] | Y * PLMN-IdentityInfo |
| TrackingAreaCodeList | N * TrackingAreaCode | PLMN-IdentityInfo = [X * PLMN |
| TrackingAreaIdentityList | lN * [PLMN identity + TrackingAreaCode] | identity + TAC + Cell id] |

Embodiments of the present disclosure set forth below are described.

Embodiment 1

If CellGlobalIdList is configured in area configuration, the UE determines whether a combination (NCGI) of PLMN-identity and CellIdentity indicated in the CellGlobalIdList is identical to a specific combination of PLMN-identity and CellIdentity broadcast in SIB1. In this case, the PLMN-identity is first PLMN-identity of first PLMN-IdentityInfo in PLMN-IdentityInfoList, and the cellIdentity is cellIdentity included in the PLMN-IdentityInfo including the PLMN-identity.

If TrackingAreaCodeList is configured in the area configuration, the UE determines whether a TAC in the TrackingAreaCodeList is identical to a TAC included in a certain PLMN-IdentityInfo broadcast in SIB1. In this case, the PLMN-IdentityInfo is first PLMN-IdentityInfo in PLMN-IdentityInfoList.

If TrackingAreaIdentityList is configured in the area configuration, the UE determines whether a combination (TAI) of PLMN-identity and TAC indicated in TrackingAreaCodeList is identical to a specific combination of PLMN-identity and TAC broadcast in SIB1. In this case, the PLMN-identity is the first PLMN-identity of the first PLMN-IdentityInfo in the PLMN-IdentityInfoList, and the TAC is a TAC included in the PLMN-IdentityInfo including the PLMN-identity.

Embodiment 2

If CellGlobalIdList is configured in area configuration, the UE determines whether a combination (NCGI) of PLMN-identity and CellIdentity indicated in the CellGlobalIdList is identical to any combination of PLMN-identity and CellIdentity broadcast in SIB1. In a case that the combination is identical to at least one combination of PLMN-identity and CellIdentity in SIB1, the UE considers that the cell is included in the configured area.

If TrackingAreaCodeList has been configured in the area configuration, the UE determines whether a TAC in the TrackingAreaCodeList is identical to a TAC included in any PLMN-IdentityInfo broadcast in SIB1. In a case that the TAC is identical to at least one combination, the UE considers that the cell belongs to the configured area.

If TrackingAreaIdentityList has been configured in the area configuration, the UE determines whether a combination (TAI) of PLMN-identity and TAC indicated in TrackingAreaIdentityList is identical to any combination of PLMN-identity and TAC broadcast in SIB1. In a case that the combination is identical to at least one combination of PLMN-identity and TAC in SIB1, the UE considers that the cell belongs to the configured area.

When the first timer expires (1$i$-45), the UE 1$i$-05 may stop the Logged MDT operation (1$i$-50).

In a case that the UE 1$i$-05 is in the RRC_IDLE or RRC_INACTIVE mode via the RRC Release message in operation 1$i$-35 described above and receives RAN or CN paging from the BS, or MO data transmission is activated, the UE 1$i$-05 may initiate an establishment or resume procedure for transitioning from the RRC_IDLE or RRC_INACTIVE mode to the RRC_CONNECTED mode.

The establishment or resume procedure may be composed of the following steps:

Step 1: The UE 1$i$-05 transmits an RRC Setup Request message or an RRC Resume Request message to the BS 1$i$-10 (1$i$-55).

Step 2: The BS 1$i$-10 transmits an RRC Setup message or an RRC Resume message to UE 1$i$-05 (1$i$-60).

Step 3: The UE 1$i$-05 transmits an RRC Setup Complete message or an RRC Resume Complete message to the BS 1$i$-10 (1$i$-65).

According to an embodiment of the present disclosure, the UE 1$i$-05 may accommodate an indicator indicating the availability of MDT data stored therein in the RRC Setup Complete or RRC Resume Complete message.

Upon receiving the RRC Setup Complete message, the BS 1$i$-10 may request, when necessary, the UE 1$i$-05 to report the MDT data by using a certain RRC message (1$i$-70). Upon receiving the request from the BS 1$i$-10, the UE 1$i$-05 may report the MDT data to the BS 1$i$-10 by using a certain RRC message (1$i$-75).

Figure 1J:
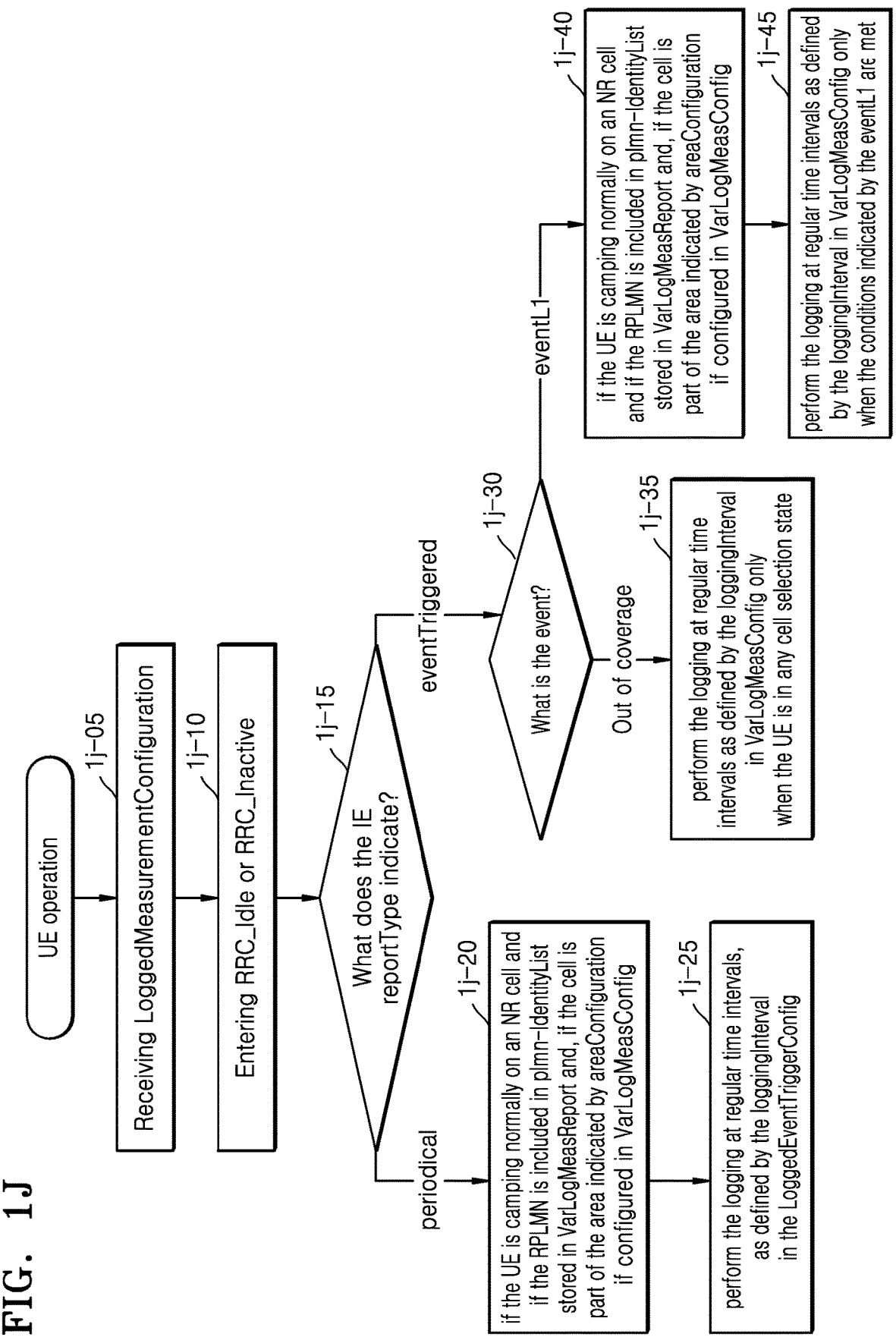
FIG. 1J is a flowchart of an operation of a terminal storing cell measurement information by taking into account a registered PLMN (RPLMN) and area configuration, according to an embodiment of the present disclosure.

FIG. 1J is a flowchart of an operation of a UE storing cell measurement information by taking into account an RPLMN and area configuration, according to an embodiment of the present disclosure.

In operation 1$j$-05, a UE receives a loggedMeasurementConfiguration message from a BS.

In operation 1$j$-10, the UE enters an RRC_IDLE or RRC_INACTIVE mode.

In operation 1$j$-15, the UE determines a reportType included in the loggedMeasurementConfiguration message.

In operation 1$j$-20, if the reportType is configured to periodical, the UE determines whether all the following conditions are satisfied.

If the UE is camping on an NR cell in a camped normally state,
If an RPLMN for the UE is configured and included in plmn-IdentityList stored by the UE, and
If the NR cell on which the UE is camping belongs to an area indicated by area configuration In operation 1$j$-25, if all the above conditions are satisfied, the UE collects and stores defined information at configured logging intervals.

In operation 1$j$-30, if the reportType is configured to eventTriggered, the UE determines a type of an event.

In operation 1$j$-35, if the event is out-of-coverage, the UE collects and stores defined information at configured logging intervals when the UE is in any cell selection state.

In operation 1$j$-40, if the event is eventL1, the UE determines whether all of the following conditions are satisfied. Here, eventL1 indicates conditions in which a signal level (reference signal received power (RSRP)) of a serving cell is below a specific threshold, which are the same conditions as event A2 in RRC_CONNECTED mode cell measurements.

If the UE is camping on an NR cell in a camped normally state,
If an RPLMN for the UE is configured and included in plmn-IdentityList stored by the UE, and
If the NR cell on which the UE is camping belongs to an area indicated by area configuration In operation 1$j$-45, if all of the above conditions are satisfied, the UE collects and stores defined information at configured logging intervals.

Figure 1K:
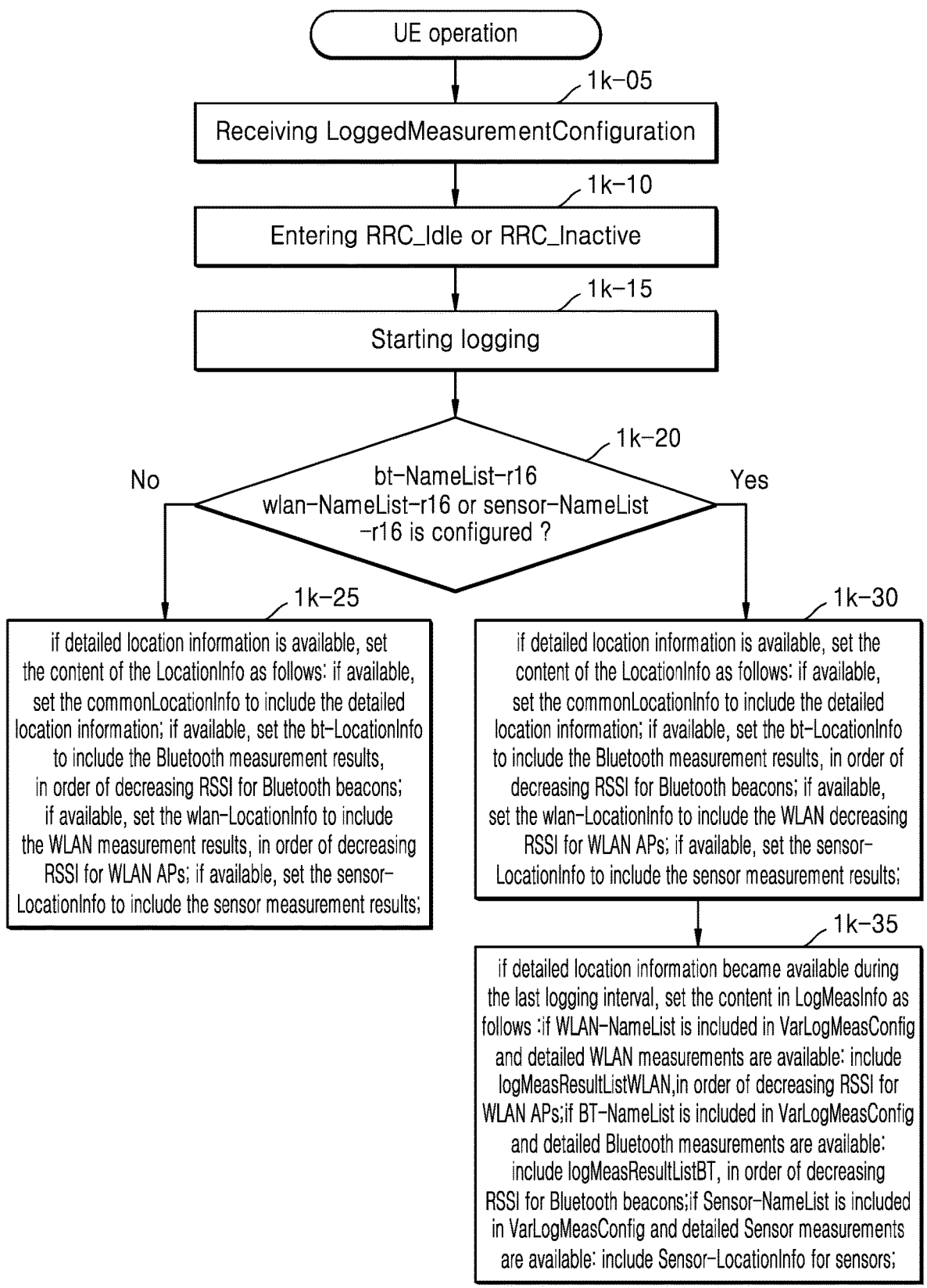
FIG. 1K is a flowchart of an operation of a terminal reporting location information, according to an embodiment of the present disclosure.

FIG. 1K is a flowchart of an operation of a UE reporting location information, according to an embodiment of the present disclosure.

In operation 1$k$-05, a UE receives a loggedMeasurementConfiguration message from a BS.

In operation 1k-10, the UE enters an RRC_IDLE or RRC_INACTIVE mode.

In operation 1k-15, the UE performs logged MDT according to the configuration.

In operation 1k-20, the UE determines whether bt-NameList, wlan-NameList, or sensor-NameList is included in the loggedMeasurementConfiguration message.

In operation 1k-25, if bt-NameList, wlan-NameList, or sensor-NameList is not included in the loggedMeasurement-Configuration message, the UE includes the following information in LocationInfo IE only for valid information.

Including valid GNSS information in commonLocationInfo IE of LocationInfo IE

Including valid Bluetooth information in bt-LocationInfo IE of LocationInfo IE, in order of decreasing RSSI for Bluetooth beacons Including valid WLAN information in wlan-LocationInfo IE of LocationInfo IE, in order of decreasing RSSI for WLAN APs Including valid sensor information in sensor-LocationInfo IE of LocationInfo IE In operation 1k-30, if the bt-NameList, wlan-NameList, or sensor-NameList is included in the loggedMeasurement-Configuration message, the UE includes the following information in LocationInfo IE only for valid information.

Including valid GNSS information in commonLocationInfo IE of LocationInfo IE

Including valid Bluetooth information in bt-LocationInfo IE of LocationInfo IE, in order of decreasing RSSI for Bluetooth beacons Including valid WLAN information in wlan-LocationInfo IE of LocationInfo IE, in order of decreasing RSSI of WLAN APs Including available Bluetooth information in sensor-LocationInfo IE of LocationInfo IE In operation 1k-35, the UE additionally includes the following information in logMeasInfo IE.

Including valid measurement results among measurement results for APs in the configured WLAN-NameList in logMeasResultListWLAN IE of logMeasInfo IE and including the WLAN information in order of decreasing RSSI of WLAN APs Including valid measurement results among measurement results for APs in the configured BT-NameList in logMeasResultListBT IE of logMeasInfo IE and including the Bluetooth information in order of decreasing RSSI for Bluetooth beacons Including valid measurement results among measurement results for APs in the configured Sensor-NameList in Sensor-LocationInfo IE of logMeasInfo IE Accordingly, when the bt-NameList, wlan-NameList, or sensor-NameList is provided, it is used for a purpose of Self Organizing Network (SON) as well as for simple location information, and is included in an IE other than LocationInfo IE.

Figure 1L:
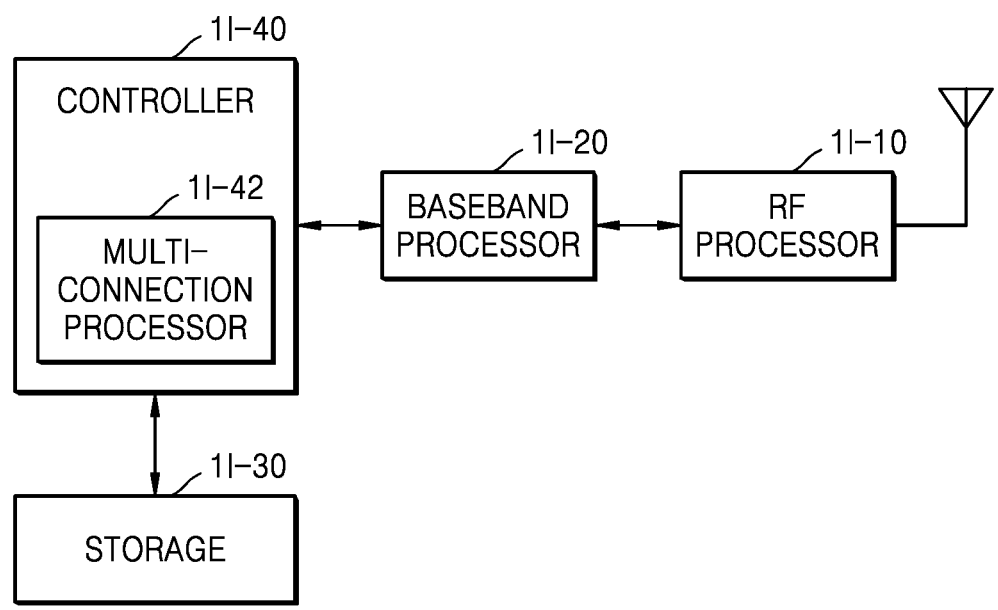
FIG. 1L is a block diagram of an internal configuration of a terminal according to an embodiment of the present disclosure.

FIG. 1L is a block diagram of an internal configuration of a UE according to an embodiment of the present disclosure.

Referring to FIG. 1L, the UE may include a radio frequency (RF) processor 1*l*-10, a baseband processor 1*l*-20, a storage 1*l*-30, and a controller 1*l*-40. However, the UE is not limited to the above example but may include fewer or more components than those illustrated in FIG. 1L.

The RF processor 1*l*-10 may perform a function for transmitting and receiving signals via a radio channel, such as signal conversion between bands and amplification. In detail, the RF processor 1*l*-10 may up-convert a baseband signal from the baseband processor 1*l*-20 into an RF signal and then transmit the RF signal via an antenna, and downconvert an RF signal received via the antenna into a baseband signal. For example, the RF processor 1*l*-10 may include a transmit filter, a receive filter, an amplifier, a mixer, an oscillator, a digital to analog convertor (DAC), an analog to digital convertor (ADC), etc. However, the RF processor 1*l*-10 is not limited to the above example. Although only one antenna is shown in FIG. 1L, the UE may include a plurality of antennas. The RF processor 1*l*-10 may also include a plurality of RF chains. Furthermore, the RF processor 1*l*-10 may perform beamforming. For beamforming, the RF processor 1*l*-10 may adjust a phase and a magnitude of each of the signals transmitted and received through a plurality of antennas or antenna elements. Furthermore, the RF processor 1*l*-10 may perform a multiple-input multiple-output (MIMO) operation and receive several layers during the MIMO operation.

The baseband processor 1*l*-20 may perform a function for conversion between a baseband signal and a bit string according to a physical layer standard of a system. For example, when transmitting data, the baseband processor 1*l*-20 may generate complex symbols by encoding and modulating a transmission bit string. Furthermore, when receiving data, the baseband processor 1*l*-20 may reconstruct a reception bit string by demodulating and decoding a baseband signal from the RF processor 1*l*-10. For example, according to an OFDM scheme, when transmitting data, the baseband processor 1*l*-20 may generate complex symbols by encoding and modulating a transmission bit string, map the complex symbols to subcarriers, and then generate OFDM symbols through inverse fast Fourier transform (IFFT) operations and cyclic prefix (CP) insertion. Furthermore, when receiving data, the baseband processor 1*l*-20 may divide the baseband signal from the RF processor 1*l*-10 into OFDM symbols, recover signals mapped to subcarriers through FFT operations, and then reconstruct a reception bit string through demodulation and decoding.

The baseband processor 1*l*-20 and the RF processor 1*l*-10 may transmit and receive signals as described above. Thus, the baseband processor 1*l*-20 and the RF processor 1*l*-10 may be referred to as a transmitter, receiver, transceiver, or communicator. Furthermore, at least one of the baseband processor 1*l*-20 and the RF processor 1*l*-10 may include a plurality of communication modules to support a plurality of different RATs. In addition, at least one of the baseband processor 1*l*-20 and the RF processor 1*l*-10 may include different communication modules to process signals in different frequency bands. For example, the different RATs may include a wireless local area network (WLAN) technology (e.g., Institute of Electrical and Electronics Engineers (IEEE) 802.11), a cellular network technology (e.g., LTE), etc. Furthermore, the different frequency bands may include super-high frequency (SHF) bands (e.g., 2.5 GHz and 5 GHz) and millimeter (mm)-wave bands (e.g., 60 GHz). The UE may transmit and receive signals to and from a BS via the baseband processor 1*l*-20 and the RF processor 1*l*-10, and the signals may include control information and data.

The storage 1*l*-30 may store basic programs, application programs, and data such as configuration information for operations of the UE. In particular, The storage 1*l*-30 may store basic programs, application programs, and data information such as configuration information for the above operations of the UE. The storage 1*l*-30 may also provide stored data at the request of the controller 1*l*-40.

The storage 1*l*-30 may be composed of storage media, such as read-only memory (ROM), random access memory (RAM), hard discs, compact disc (CD)-ROM, and digital versatile discs (DVDs), or a combination thereof. Furthermore, the storage 1*l*-30 may include a plurality of memories.

The controller 1*l*-40 may control all operations of the UE. For example, the controller 1*l*-40 may transmit or receive signals via the baseband processor 1*l*-20 and the RF processor 1*l*-10. The controller 1*l*-40 may also write and read data to and from the storage 1*l*-40. To do so, the controller 1*l*-40 may include at least one processor. For example, the controller 1*l*-40 may include a communication processor (CP) for performing control for communication and an application processor (AP) for controlling higher layers such as application programs. Furthermore, according to an embodiment of the present disclosure, the controller 1*l*-40 may include a multi-connectivity processor 1*l*-42 that performs processing for operating in a multi-connectivity mode. In addition, at least one component in the UE may be implemented as a single chip.

Figure 1M:
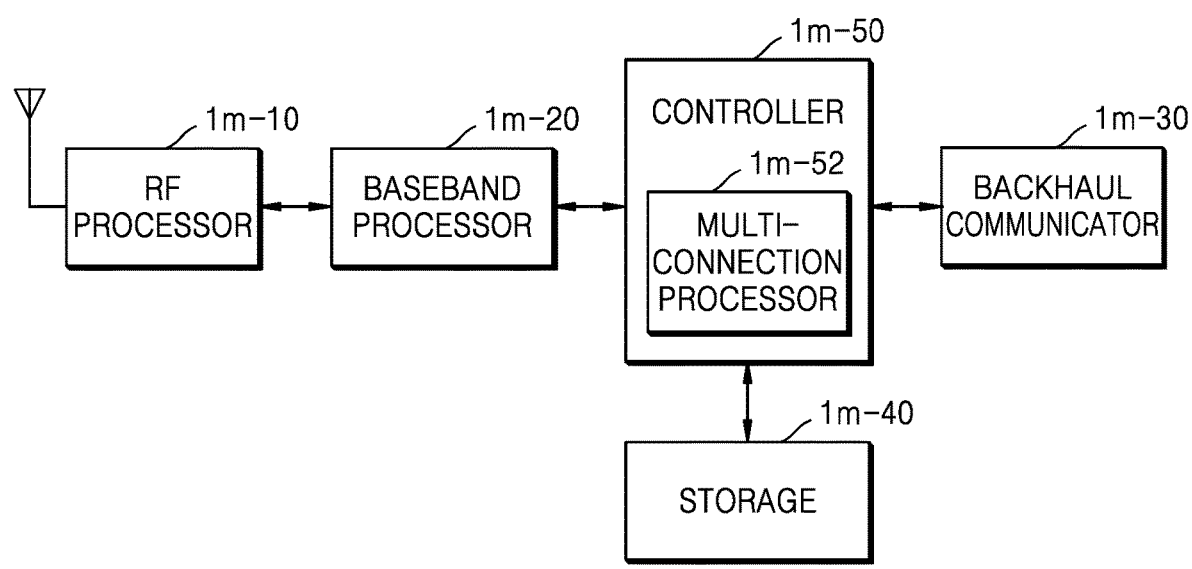
FIG. 1M is a block diagram of a configuration of a base station according to an embodiment of the present disclosure.

FIG. 1M is a block diagram of a configuration of a BS according to the present disclosure.

Referring to FIG. 1M, the BS may include an RF processor 1*m*-10, a baseband processor 1*m*-20, a backhaul communicator 1*m*-30, a storage 1*m*-40, and a controller 1*m*-50. However, the BS is not limited to the above example but may include fewer or more components than those illustrated in FIG. 1M.

The RF processor 1*m*-10 may perform a function for transmitting and receiving signals via a radio channel, such as signal conversion between bands and amplification. In detail, the RF processor 1*m*-10 may up-convert a baseband signal from the baseband processor 1*m*-20 into an RF signal and then transmit the RF signal via an antenna, and down-convert an RF signal received via the antenna into a baseband signal. For example, the RF processor 1*m*-10 may include a transmit filter, a receive filter, an amplifier, a mixer, an oscillator, a DAC, an ADC, etc. Although only one antenna is shown in FIG. 1M, the RF processor 1*m*-10 may include a plurality of antennas.

Furthermore, the RF processor 1*m*-10 may include a plurality of RF chains. Furthermore, the RF processor 1*m*-10 may perform beamforming. For beamforming, the RF processor 1*m*-10 may adjust a phase and magnitude of each of the signals transmitted and received through a plurality of antennas or antenna elements. Furthermore, the RF processor 1*m*-10 may perform a DL MIMO operation by transmitting one or more layers.

The baseband processor 1*m*-20 may perform a function for conversion between a baseband signal and a bit string according to a physical layer standard. For example, when transmitting data, the baseband processor 1*m*-20 may generate complex symbols by encoding and modulating a transmission bit string. Furthermore, when receiving data, the baseband processor 1*m*-20 may reconstruct a reception bit string by demodulating and decoding a baseband signal from the RF processor 1*m*-10. For example, according to an OFDM scheme, when transmitting data, the baseband processor 1*m*-20 may generate complex symbols by encoding and modulating a transmission bit string, map the complex symbols to subcarriers, and then generate OFDM symbols through IFFT operations and CP insertion. Furthermore, when receiving data, the baseband processor 1*m*-20 may divide the baseband signal from the RF processor 1*m*-10 into OFDM symbols, recover signals mapped to subcarriers through FFT operations, and then reconstruct a reception bit string through demodulation and decoding. The baseband processor 1*m*-20 and the RF processor 1*m*-10 may transmit and receive signals as described above. Thus, the baseband processor 1*m*-20 and the RF processor 1*m*-10 may be referred to as a transmitter, receiver, transceiver, communicator, or wireless communicator. The BS may transmit and receive signals to and from the UE via the baseband processor 1*m*-20 and the RF processor 1*m*-10, and the signals may include control information and data.

The backhaul communicator 1*m*-30 may provide an interface to communicate with other nodes in the network. For example, the backhaul communicator 1*m*-30 may convert a bit string to be transmitted from a primary BS to another node, such as a secondary BS and a CN, into a physical signal, and convert a physical signal received from the other node into a bit string.

The storage 1*m*-40 stores basic programs, application programs, and data such as configuration information for operations of the BS. In particular, the storage 1*m*-40 may store information about bearers allocated to a connected UE, measurement results reported by the connected UE, etc. Furthermore, the storage 1*m*-40 may store information that is a criterion for determining whether to provide or terminate multiple connectivity to or from the UE. The storage 1*m*-40 may also provide stored data at the request of the controller 1*m*-50. The storage 1*m*-40 may be composed of storage media, such as ROM, RAM, hard discs, CD-ROM, and DVDs, or a combination thereof. Furthermore, the storage 1*m*-40 may include a plurality of memories.

The controller 1*m*-50 may control all operations of the BS. For example, the controller 1*m*-50 may transmit or receive signals through the baseband processor 1*m*-20 and the RF processor 1*m*-10 or through the backhaul communicator 1*m*-30. The controller 1*m*-50 may also write and read data to and from the storage 1*m*-40. To do so, the controller 1*m*-50 may include at least one processor. Furthermore, according to an embodiment of the present disclosure, the controller 1*m*-50 may include a multi-connectivity processor 1*m*-52 that performs processing for operating in a multi-connectivity mode.

Methods according to embodiments of the present disclosure described in the appended claims or specification thereof may be implemented in hardware, software, or a combination of hardware and software.

When the methods are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), magnetic disc storage devices, CD-ROM, DVDs or other types of optical storage devices, and magnetic cassettes. Alternatively, the program may be stored in a memory that is configured as a combination of some or all of the stated devices. A plurality of such memories may be included.

Furthermore, the program may be stored in an attachable storage device that may be accessed through communication networks such as the Internet, Intranet, a LAN, a wide LAN (WLAN), and a storage area network (SAN) or a communication network configured in a combination thereof. Such a storage device may connect to a device for performing the methods according to the embodiments of the present disclosure via an external port. In addition, a separate storage device on the communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for the presented situations for convenience of descriptions, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents. It is obvious to those of ordinary skill in the art that other modifications based on the technical spirit of the present disclosure are implementable. The embodiments may be combined with each other for operation when necessary. For example, parts of the methods presented in the present disclosure may be combined with one another to operate a BS and a UE. Although the embodiments are proposed based on a 5G or NR system, other modifications based on the technical spirit of the embodiments may be applicable to other systems such as LTE, LTE-A, and LTE-A-Pro systems.

What is claimed is:

1. An operation method of a user equipment (UE) in a wireless communication system, the operation method comprising:
   receiving, from a base station, a radio resource control (RRC) message including Logged minimization of drive test (MDT) configuration information, wherein the Logged MDT configuration information includes area configuration information;
   identifying a report type, based on the Logged MDT configuration information;
   determining whether conditions corresponding to an event type of the report type are satisfied, based on the Logged MDT configuration information;
   determining whether a cell is included in a logging area, based on a system information block type 1 (SIB1) and the area configuration information, wherein the SIB1 is broadcasted from the cell;
   performing logging of at least one measurement while the UE is in an RRC IDLE mode or an RRC INACTIVE mode within the logging area in case that the conditions are satisfied.

2. The operation method of claim 1, wherein the conditions corresponding to the event type of the report type are satisfied in case that the UE camps on the cell in a camped normally state, a registered public land mobile network (RPLMN) is included in a public land mobile network (PLMN) identity list stored in the UE, and the cell is included in the logging area indicated in the area configuration information.

3. The operation method of claim 1,
   wherein the SIB1 includes a PLMN identity information list,
   wherein the Logged MDT configuration information further includes at least one of the report type, the event type, or a PLMN identity list;
   wherein the area configuration information includes a new radio cell global identifier (NCGI), and
   wherein the NCGI includes a PLMN identity and a cell identity corresponding to the PLMN identity.

4. The operation method of claim 1, wherein
   the determining whether the cell is included in the logging area comprises:
   determining whether a PLMN identity included in the area configuration information is identical to a PLMN identity corresponding to a first entry of a PLMN identity list in a first entry of a PLMN identity information list included in the SIB1; and
   determining whether a cell identity included in the area configuration information belongs to a cell identity corresponding to the first entry of the PLMN identity information list included in the SIB1.

5. The operation method claim 1, wherein the determining whether the cell is included in the logging area comprises:
   determining whether the cell is included in the logging area, based on the area configuration information and information corresponding to a first entry of a PLMN identity information list in the SIB1, and
   wherein the area configuration information includes a cell identity and tracking area code (TAC).

6. An operation method of a base station in a wireless communication system, the operation method comprising:
   transmitting, to a user equipment (UE), a radio resource control (RRC) message including Logged minimization of drive test (MDT) configuration information, wherein the Logged MDT configuration information includes area configuration information; and
   receiving, from the UE, a message including logging of at least one measurement,
   wherein the at least one measurement is logged while the UE is in an RRC IDLE mode or an RRC INACTIVE mode within a logging area, based on whether conditions corresponding to an event type of a report type are satisfied based on the Logged MDT configuration information, and
   wherein whether a cell is included in the logging area is associated with a system information block type 1 (SIB1) and the area configuration information, wherein the SIB1 is broadcasted from the cell.

7. The operation method of claim 6, wherein the conditions corresponding to the event type of the report type are satisfied in case that the UE camps on the cell in a camped normally state, a registered public land mobile network (RPLMN) is included in public land mobile network (PLMN) identity list stored in the UE, and the cell is included in the logging area in in the area configuration information.

8. The operation method of claim 6,
   wherein the SIB1 includes, a PLMN identity information list,
   wherein the Logged MDT configuration information further includes at least one of the report type, the event type, or a PLMN identity list, and
   wherein the area configuration information includes a new radio cell global identifier (NCGI), and wherein the NCGI includes a PLMN identity and a cell identity corresponding to the PLMN identity.

9. The operation method of claim 6,
   wherein, the cell is included in the logging area in case that a PLMN identity included in the area configuration information is identical to a PLMN identity corresponding to a first entry of a PLMN identity list in a first entry of a PLMN identity information list included in the SIB1, and a cell identity in included in the area configuration information belongs to a cell identity corresponding to the first entry of the PLMN identity information list included in the SIB1.

10. The operation method of claim 6,
wherein whether the cell is included in the logging area is associated with the area configuration information and information corresponding to a first entry of PLMN identity information list in the SIB1, and
wherein the area configuration information includes a cell identity and tracking area code TAC.

11. A user equipment (UE) operating in a wireless communication system, the UE comprising:
a communicator; and
at least one processor coupled with the communicator and configured to:
receive, from a base station, a radio resource control (RRC) message including Logged minimization of drive test (MDT) configuration information, wherein the Logged MDT configuration information includes area configuration information,
identify a report type, based on the Logged MDT configuration information,
determine whether conditions corresponding to an event type of the report type ae satisfied, based on the Logged MDT configuration information,
determine whether a cell is included in a logging area, based on a system information block type 1 (SIB1) and the area configuration information, wherein the SIB1 is broadcasted from the cell, and
perform logging of at least one measurement while the UE is in an RRC IDLE mode or an RRC INACTIVE mode within the logging area in case that the conditions are satisfied.

12. The UE of claim 11, wherein
conditions corresponding to the event type of the report type are satisfied in case that the UE camps on the cell in a camped normally state, a registered public land mobile network (RPLMN) is included in a public land mobile network (PLMN) identity list stored in the UE, and the cell is included in the logging area indicated in the area configuration information.

13. The UE of claim 11,
wherein the SIB1 includes a PLMN identity information list,
wherein the Logged MDT configuration information further includes at least one of the report type, the event type, or a PLMN identity list,
wherein the area configuration information includes a new radio cell global identifier (NCGI), and
wherein the NCGI includes a PLMN identity and a cell identity corresponding to the PLMN identity.

14. The UE of claim 11, wherein the at least one processor is further configured to:
determine whether a PLMN identity included in the area configuration information is identical to a PLMN identity corresponding to a first entry of a PLMN identity list in a first entry of a PLMN identity information list included in the SIB1; and
determine whether a cell identity included in the area configuration information belongs to a cell identity corresponding to the first entry of the PLMN identity information list included in the SIB1.

15. The UE of claim 11,
wherein the at least one processor is further configured to determine whether the cell is included in the logging area, based on the area configuration information and information corresponding to a first entry of PLMN identity information list in the SIB1, and
wherein the area configuration information includes a cell identity and tracking area code (TAC).

* * * * *